United States Patent
Yoshie et al.

(10) Patent No.: US 10,715,080 B2
(45) Date of Patent: Jul. 14, 2020

(54) POWER SUPPLY DEVICE USING SOLAR CELL, ELECTRONIC APPARATUS SUCH AS COMMUNICATION APPARATUS EQUIPPED WITH THE SAME, AND SIGNBOARD APPARATUS

(71) Applicant: SHARP KABUSHIKI KAISHA, Sakai, Osaka (JP)

(72) Inventors: Tomohisa Yoshie, Sakai (JP); Atsushi Fukui, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 182 days.

(21) Appl. No.: 16/079,770

(22) PCT Filed: Feb. 22, 2017

(86) PCT No.: PCT/JP2017/006480
§ 371 (c)(1),
(2) Date: Aug. 24, 2018

(87) PCT Pub. No.: WO2017/146074
PCT Pub. Date: Aug. 31, 2017

(65) Prior Publication Data
US 2019/0057818 A1    Feb. 21, 2019

(30) Foreign Application Priority Data

Feb. 26, 2016   (JP) .................................. 2016-035805

(51) Int. Cl.
*H02S 40/38*   (2014.01)
*H02S 50/00*   (2014.01)
(Continued)

(52) U.S. Cl.
CPC ........... *H02S 40/38* (2014.12); *H01G 9/2068* (2013.01); *H02J 7/0068* (2013.01); *H02J 7/345* (2013.01);
(Continued)

(58) Field of Classification Search
CPC ....................................................... H02S 40/38
See application file for complete search history.

(56) References Cited

U.S. PATENT DOCUMENTS

2013/0300449 A1* 11/2013 Nakamura ........ H01L 31/02021
324/761.01
2018/0358797 A1* 12/2018 Chaintreuil .......... H02H 1/0092

FOREIGN PATENT DOCUMENTS

JP       2012-167470 A      9/2012

* cited by examiner

*Primary Examiner* — Daniel J Cavallari
(74) *Attorney, Agent, or Firm* — ScienBiziP, P.C.

(57) ABSTRACT

An object of the present disclosure is to suppress deterioration of a single cell in a power supply device that uses a solar cell module including a plurality of single cells so as to extend the performance retention time of the solar cell module.

The power supply device comprises a solar cell module including a plurality of solar cells that are electrically connected in series; and an output control circuit that supplies the electric power generated by the solar cell module to the load when an output voltage of the solar cell module increases and reaches a predetermined first voltage V1, and that interrupts the supplying of the electric power generated by the solar cell module to the load when the output voltage of the solar cell module decreases and reaches a predetermined second voltage V2, wherein the second voltage V2 is lower than the first voltage V1 and is higher than a second highest output voltage of output (Continued)

voltages of the solar cell module corresponding to inflection points in a current-voltage characteristic of the solar cell module.

18 Claims, 14 Drawing Sheets

(51) Int. Cl.
*H02J 7/35* (2006.01)
*H01G 9/20* (2006.01)
*H02S 50/10* (2014.01)
*H02J 7/00* (2006.01)
*H02J 7/34* (2006.01)

(52) U.S. Cl.
CPC ................ *H02J 7/35* (2013.01); *H02S 50/00* (2013.01); *H02S 50/10* (2014.12); *H01G 9/2031* (2013.01); *H01G 9/2059* (2013.01); *Y02E 10/542* (2013.01); *Y02E 10/566* (2013.01)

Fig.7
| | V1 | V2 | P1 | P2 | A (100×P2/P1) |
|---|---|---|---|---|---|
| PRACTICAL EXAMPLE 1 | 4.5V | 1.5V | 1.59mW | 1.56mW | 98% |
| PRACTICAL EXAMPLE 2 | 4.5V | 1.2V | 1.33mW | 1.30mW | 97% |
| PRACTICAL EXAMPLE 3 | 4.5V | 2.5V | 1.62mW | 1.60mW | 99% |
| COMPARATIVE EXAMPLE 1 | 4.5V | 1.0V | 1.60mW | 1.36mW | 85% |
Fig.8
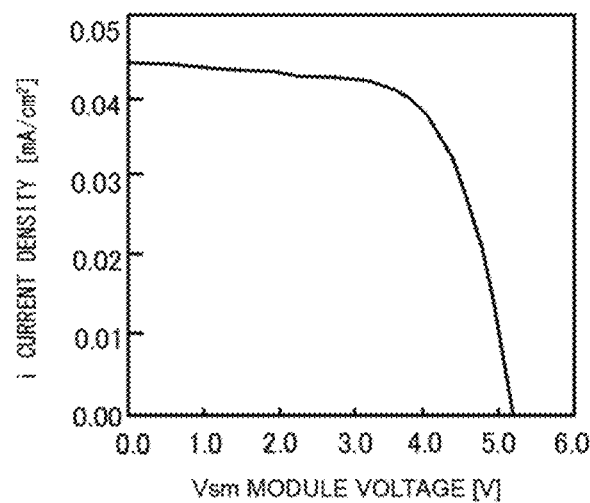
Fig.9
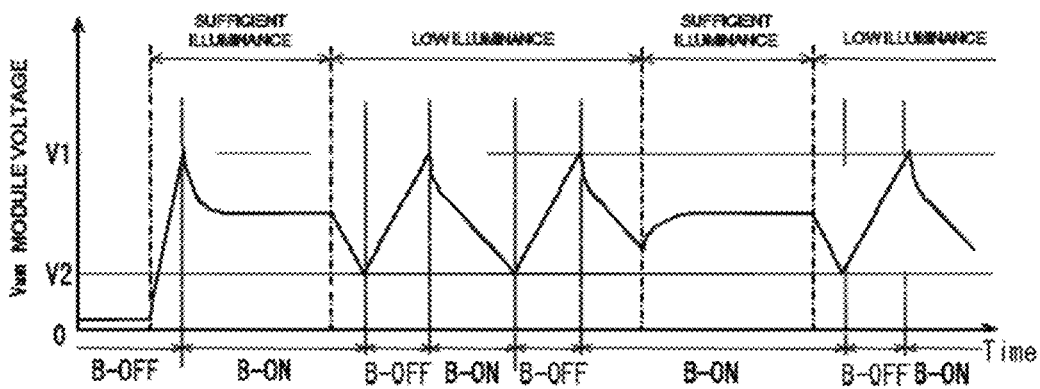

Fig.16

| | P1 | P2 | PERFORMANCE RETENTION RATE 100×P2/P1 | (du/dV) max | Vmax PEAK VOLTAGE | V1=2.3V Voc OPEN CIRCUIT VOLTAGE | V2=0.6V Voc×(N-3)/N |
|---|---|---|---|---|---|---|---|
| PRACTICAL EXAMPLE 4 | 1.11mW | 1.08mW | 84% | -3.3×10⁻³ | 0.94V | 2.60V | 1.040 |
| PRACTICAL EXAMPLE 5 | 1.07mW | 1.08mW | 85% | -8.1×10⁻³ | 1.11V | 2.58V | 1.032 |
| PRACTICAL EXAMPLE 6 | 1.12mW | 1.11mW | 86% | -3.2×10⁻³ | 1.09V | 2.57V | 1.028 |
| PRACTICAL EXAMPLE 7 | 1.07mW | 1.08mW | 86% | -6.0×10⁻³ | 1.04V | 2.59V | 1.036 |
| PRACTICAL EXAMPLE 8 | 1.12mW | 1.09mW | 87% | -4.6×10⁻³ | 1.07V | 2.62V | 1.048 |
| PRACTICAL EXAMPLE 9 | 1.08mW | 1.05mW | 87% | -6.8×10⁻³ | 1.10V | 2.62V | 1.048 |
| PRACTICAL EXAMPLE 10 | 1.12mW | 1.04mW | 85% | -3.6×10⁻³ | 0.92V | 2.60V | 1.040 |
| COMPARATIVE EXAMPLE 2 | 1.08mW | 0.95mW | 88% | -1.1×10⁻² | 1.20V | 2.61V | 1.044 |
| COMPARATIVE EXAMPLE 3 | 1.08mW | 0.90mW | 85% | -1.4×10⁻² | 1.16V | 2.59V | 1.040 |
| COMPARATIVE EXAMPLE 4 | 1.08mW | 0.93mW | 86% | -1.0×10⁻² | 1.10V | 2.60V | 1.040 |
| COMPARATIVE EXAMPLE 5 | 1.02mW | 0.91mW | 89% | -0.7×10⁻³ | 1.12V | 2.60V | 1.036 |
| COMPARATIVE EXAMPLE 6 | 1.13mW | 0.98mW | 87% | -9.8×10⁻³ | 1.00V | 2.60V | 1.044 |

Fig.19

| | P1 | P2 | PERFORMANCE RETENTION RATE 100×P2/P1 | (dJ/dV) max | Vmax PEAK VOLTAGE | Voc OPEN-CIRCUIT VOLTAGE | N | Voc × (N-9)/N |
|---|---|---|---|---|---|---|---|---|
| PRACTICAL EXAMPLE 5 | 1.07mW | 1.05mW | 98% | -5.1×10⁻³ | 1.11V | 2.58V | 8 | 1.032 |
| PRACTICAL EXAMPLE 6 | 1.12mW | 1.11mW | 99% | -3.2×10⁻³ | 1.09V | 2.57V | 8 | 1.028 |
| PRACTICAL EXAMPLE 7 | 1.07mW | 1.03mW | 96% | -6.9×10⁻³ | 1.04V | 2.59V | 8 | 1.036 |
| PRACTICAL EXAMPLE 8 | 1.12mW | 1.09mW | 97% | -4.6×10⁻³ | 1.07V | 2.62V | 8 | 1.048 |
| PRACTICAL EXAMPLE 9 | 1.08mW | 1.05mW | 97% | -6.8×10⁻³ | 1.10V | 2.62V | 8 | 1.048 |
| PRACTICAL EXAMPLE 11 | 2.12mW | 2.08mW | 98% | -5.2×10⁻³ | 0.72V | 5.20V | 10 | 1.040 |
| PRACTICAL EXAMPLE 12 | 2.08mW | 2.00mW | 96% | -9.5×10⁻³ | 0.62V | 5.05V | 10 | 1.044 |
| PRACTICAL EXAMPLE 13 | 3.20mW | 3.14mW | 98% | -4.3×10⁻³ | 0.29V | 7.78V | 15 | 1.040 |
| PRACTICAL EXAMPLE 14 | 3.11mW | 2.95mW | 95% | -4.2×10⁻³ | 0.35V | 7.87V | 15 | 1.038 |

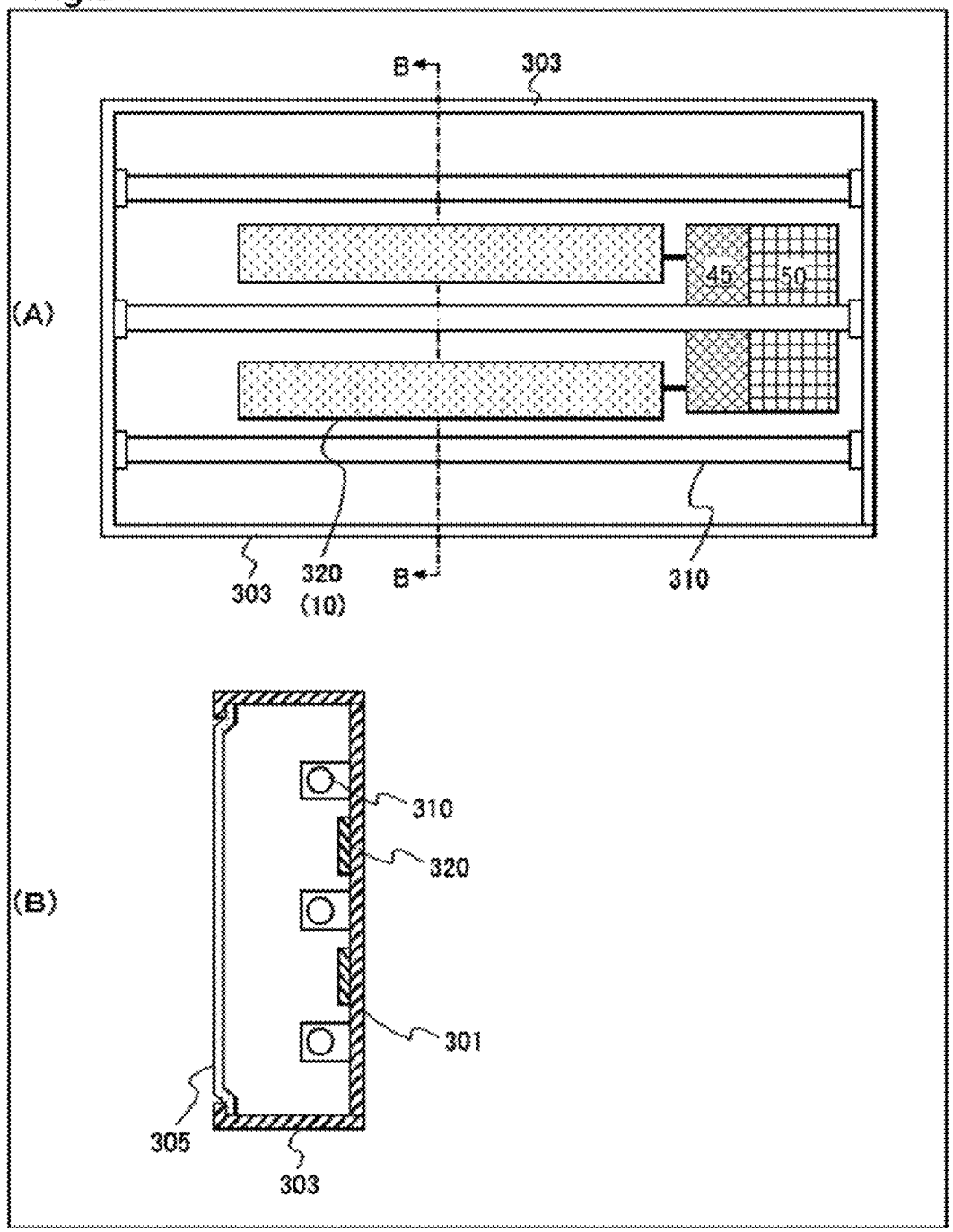

POWER SUPPLY DEVICE USING SOLAR CELL, ELECTRONIC APPARATUS SUCH AS COMMUNICATION APPARATUS EQUIPPED WITH THE SAME, AND SIGNBOARD APPARATUS

TECHNICAL FIELD

The following disclosure relates to a power supply device using a solar cell module including a plurality of solar cells connected in series, an electronic apparatus such as a communication apparatus equipped with such a power supply device, and a signboard apparatus.

BACKGROUND ART

In a power supply device that uses a solar cell, a solar cell module that includes a plurality of solar cells (single cells) connected in series each other is used for obtaining a voltage required for driving a device serving as a load. For example, it an open-circuit voltage output from one of the single cells of the solar cell is about 0.5 V, a solar cell module constituted of five single cells connected in series each other is fabricated in order to drive a device that operates with a power supply voltage of about 2.5 V.

Patent Literature 1 related to the following disclosure discloses an invention of a lighting device that includes a dye-sensitized solar cell, which is a type of a solar cell, a plurality of capacitors for storing electric power generated by the dye-sensitized solar cell, a light source that emits light in accordance with the electric power from the dye-sensitized solar cell and the plurality of capacitors, and a control circuit that controls on-off operation of the light source. According to this invention, with the use of the dye-sensitized solar cell, a decrease in the amount of generated power can be suppressed even indoors, while an electric charge that can be released at once can be increased with the use of the plurality of capacitors, thereby momentarily increasing the luminance of light emitted from the light source.

CITATION LIST

Patent Literature

PTL 1: Japanese Unexamined Patent Application Publication No. 2012-167470

SUMMARY OF INVENTION

Technical Problem

In a solar cell module that includes a plurality of single cells connected in series each other, if any one of the single cells has low performance, the low-performance single cell deteriorates as the usage time thereof increases, thus making it impossible to maintain the desired performance of the solar cell module. Therefore, in a solar cell module that includes a low-performance single cell, the time in which the desired performance can be maintained (referred to as "performance retention time" hereinafter) becomes shorter. In addition, even if the plurality of single cells constituting the solar cell module have uniform performance, if the illuminance of light radiated onto the solar cell module is not uniform, a single cell with low illuminance deteriorates, similarly resulting in a shorter performance retention time.

In the following disclosure, an object is to suppress deterioration of a single cell in a power supply device that uses a solar cell module including a plurality of single cells connected in series each other so as to extend the performance retention time of the solar cell module.

Solution to Problem

A first aspect of the present invention provides a power supply device that supplies electric power generated by a solar cell to a load. The power supply device includes a solar cell module including a plurality of solar cells that are electrically connected in series each other, and also includes an output control circuit that supplies the electric power generated by the solar cell module to the load when an output voltage of the solar cell module increases and reaches a predetermined first voltage V1, and that interrupts the supplying of the electric power generated by the solar cell module to the load when the output voltage of the solar cell module decreases and reaches a predetermined second voltage V2. The second voltage V2 is lower than the first voltage V1 and is higher than a second highest output voltage of output voltages of the solar cell module corresponding to inflection points in a current-voltage characteristic of the solar cell module.

According to a second aspect of the present invention, the power supply device according to the first aspect of the present invention may further include a capacitor that is provided between the solar cell module and the output control circuit and that is connected in parallel with the solar cell module.

According to a third aspect of the present invention, in the first or second aspect of the present invention, the plurality of solar cells may be of a dye-sensitized type.

According to a fourth aspect of the present invention, in the third aspect of the present invention, the second voltage V2 may satisfy an inequality expression indicated below:

$$V2 \geq 0.12 \times N \text{ [V]}$$

where N denotes the number of solarcells connected in series in the solar cell module.

According to a fifth aspect of the present invention, in the third or fourth aspect of the present invention, an absolute value of a maximum-differential-peak value defined as a maximum value of absolute peak values in a differential characteristic of the current-voltage characteristic of the solar cell module may be lower than or equal to $6.9 \times 10^{-3}$ mA/(cm²·V).

A sixth aspect of the present invention provides a power supply device that supplies electric power generated by a solar cell to a load. The power supply device includes a solar cell module including a plurality of dye-sensitized solar cells that are electrically connected in series, and also includes an output control circuit that supplies the electric power generated by the solar cell module to the load when an output voltage of the solar cell module increases and reaches a predetermined first voltage V1, and that interrupts the supplying of the electric power generated by the solar cell module to the load when the output voltage of the solar cell module decreases and reaches a predetermined second voltage V2. The second voltage V2 is lower than the first voltage V1 and satisfies an inequality expression indicated below:

$$V2 \geq 0.12 \times N \text{ [V]}$$

where N denotes the number of dye-sensitized solar cells connected in series in the solar cell module.

According to a seventh aspect of the present invention, in the sixth aspect of the present invention, an absolute of a maximum-differential-peak value defined as a maximum value of absolute peak values in a differential characteristic of a current-voltage characteristic of the solar cell module may be lower than or equal to $6.9 \times 10^{-3}$ mA/(cm$^2 \cdot$V).

According to an eighth aspect of the present invention, in any one of the first or seventh aspects of the present invention, a peak voltage Vmax defined as an output voltage of the solar cell module corresponding to a maximum value of absolute peak values in a differential characteristic of a current-voltage characteristic of the solar cell module may satisfy an inequality expression indicated below:

$$V\mathrm{max} \geq Voc \times (N-3)/N$$

where Voc denotes an open-circuit voltage of the solar cell module, and N denotes the number of solar cells connected in series in the solar cell module.

According to a ninth aspect of the present invention, in any one of the first to eighth aspects of the present invention, the second voltage V2 may satisfy an inequality expression indicated below:

$$V2 > V\mathrm{max}$$

where Vmax denotes an output voltage of the solar cell module corresponding to a maximum value of absolute peak values in a differential characteristic of a current-voltage characteristic of the solar cell module.

A tenth aspect of the present invention provides an electronic apparatus including the power supply device according to any one of the first to ninth aspects of the present invention and an electronic device that receives the electric power supplied from the power supply device serving as the load.

According to an eleventh aspect of the present invention, in the tenth aspect of the present invention, the electronic device may be a beacon transmitter, and the electronic apparatus may be a communication apparatus.

A twelfth aspect of the present invention provides a signboard apparatus having a display board and a light source that radiates light onto the display board. The signboard apparatus includes the power supply device according to any one of the first to ninth aspects of the present invention and a beacon transmitter that receives the electric power supplied from the power supply device serving as the load. The solar cell module in the power supply device is disposed so as to be capable of receiving light directly or indirectly from the light source.

Since other aspects of the present invention are apparent from the first to twelfth aspects of the present invention and the description related to embodiments to be described below, descriptions thereof will be omitted.

Advantageous Effects of Invention

According to the first aspect of the present invention, when the output voltage of the solar cell module increases as a result of radiation of light onto the solar cells (solar cell module) and reaches the first voltage V1, the electric power generated by the solar cell module is supplied to the load. Subsequently, while the output voltage is higher than the second voltage V2, the supplying of the electric power to the load continues. When the output voltage of the solar cell module decreases to the second voltage V2 due to decreased illuminance in the solar cell module, the supplying of the electric power to the load is interrupted. The second voltage V2 is set in advance to a value lower than the first voltage V1 and higher than the second highest output voltage of output voltages corresponding to the inflection points in the current-voltage characteristic of the solar cell module. Therefore, even if any one of the plurality of solar cells electrically connected in series in the solar cell module and constituting the solar cell module is a low-performance solar cell, the occurrence of a reverse bias to the low-performance solar cell is suppressed since the supplying of electric power is interrupted based on the second voltage V2 when the output voltage decreases. As a result, deterioration of the solar cell module is suppressed, so that a high performance retention rate with respect to the solar cell module can be achieved, and the performance retention time can be extended. Normally, even in a case where the plurality of solar cells constituting the solar cell module have the same performance, if the illuminance varies among the plurality of solar cells, deterioration caused by a reverse bias becomes a problem, similarly to the case where a low-performance solar cell is included. However, even in such a case, the occurrence of a reverse bias to the solar cell with low illuminance can be suppressed in accordance with the first aspect of the present invention. The same applies to the other aspects of the present invention.

According to the second aspect of the present invention, the electric power generated by the solar cell module is temporarily stored in the capacitor, and the electric power is supplied to the load via the capacitor. Therefore, an increase or decrease in electric power generated in accordance with a change in illuminance in the solar cell module and an increase or decrease in electric power consumed in accordance with a fluctuation in the load are compensated for by charging and discharging of the capacitor in the capacitor unit, whereby the output voltage of the power supply device is stabilized.

According to the third aspect of the present invention, the solar cells included in the solar cell module are of a dye-sensitized type and can be manufactured at low cost, so that the cost of the solar cell module can be reduced. In addition, since the power generating properties of a dye-sensitized solar cell has low dependency on illuminance, the power supply device using the solar cell module can be used at a location with low illuminance. Moreover, at a location with low illuminance where a dye-sensitized solar cell is to be suitably used, the illuminance tends to be nonuniform among the solar cells, as compared with an outdoor environment, thus causing a reverse bias to occur readily in the solar cells. However, the third aspect of the present invention can prevent the occurrence of a reverse bias even in an environment where the illuminance is nonuniform, so that deterioration of a solar cell module constituted of dye-sensitized solar cells is suppressed.

According to the fourth aspect of the present invention, the solar cell module is constituted of dye-sensitized solar cells, and the second voltage V2 is set to be higher than or equal to $0.12 \times N$ [V], so that even if a low-performance solar cell is included in N solar cells connected in series in the dye-sensitized solar cell module, the occurrence of a reverse bias to the low-performance solar cell is suppressed. As a result, deterioration of the dye-sensitized solar cell module is suppressed.

According to the fifth aspect of the present invention, because the maximum value (absolute of a maximum-differential-peak value) of the absolute peak values in the differential characteristic of the current-voltage characteristic of the dye-sensitized solar cell module is lower than or equal to $6.9 \times 10^{-3}$ mA/(cm$^2 \cdot$V), the occurrence of a reverse bias to a low-performance solar cell included in the dye-sensitized solar cell module is further suppressed. As a result, deterioration of the dye-sensitized solar cell module is further suppressed.

According to the sixth aspect of the present invention, when the output voltage of the dye-sensitized solar cell module increases as a result of radiation of light onto the dye-sensitized solar cell module and reaches the first voltage V1, the electric power generated by the dye-sensitized solar cell module is supplied to the load. Subsequently, while the output voltage is higher than the second voltage V2, the supplying of the electric power to the load continues. When the output voltage of the dye-sensitized solar cell module becomes lower than the second voltage V2 due to decreased illuminance in the dye-sensitized solar cell module, the supplying of the electric power to the load is interrupted. The second voltage V2 is set to a value higher than or equal to 0.12×N [V]. Thus, even if a low-performance solar cell is included in N solar cells connected in series in the dye-sensitized solar cell module, the occurrence of a reverse bias to the low-performance solar cell is suppressed. As a result, deterioration of the dye-sensitized solar cell module is suppressed, so that a high performance retention rate with respect to the dye-sensitized solar cell module can be achieved, and the performance retention time can be extended.

According to the seventh aspect of the present invention, because the maximum value (absolute value of a maximum-differential-peak value) of the absolute peak values in the differential characteristic of the current-voltage characteristic of the dye sensitized solar cell module is lower than or equal to $6.9 \times 10^{-3}$ mA/(cm$^2 \cdot$V), the occurrence of a reverse bias to a low-performance solar cell included in the dye-sensitized solar cell module is further suppressed. As a result, deterioration of the dye-sensitized solar cell module is further suppressed.

According to the eighth aspect of the present invention, the output voltage (peak voltage) Vmax of the solar cell module corresponding to the maximum value of the absolute peak values in the differential characteristic of the current-voltage characteristic of the solar cell module is set to be higher than or equal to Voc×(N−3)/N, so that the occurrence of a reverse bias to the low-performance solar cell included in the solar cell module is further suppressed. As a result, deterioration of the solar cell module is further suppressed.

According to the ninth aspect of the present invention, the second voltage V2 is set to be higher than the peak voltage Vmax, so that the occurrence of a reverse bias to the low-performance solar cell included in the solar cell module is suppressed more reliably. As a result, deterioration of the dye-sensitized solar cell module is suppressed more reliably.

According to the tenth aspect of the present invention, in the electronic apparatus including the power supply device that supplies electric power generated by the solar battery to the load and also including the electronic device serving as the load, advantages similar to those in the first to ninth aspects of the present invention are achieved.

According to the eleventh aspect of the present invention, in the communication apparatus serving as the electronic apparatus including the power supply device that supplies electric power generated by the solar battery to the load and also including the beacon transmitter serving as the load, advantages similar to those in the first to ninth aspects of the present invention are achieved.

According to the twelfth aspect of the present invention, the signboard apparatus having the display board and the light source that radiates tight onto the display board is provided with the power supply device that supplies electric power generated by the solar battery to the load and the beacon transmitter serving as the load. The electric power for operating the beacon transmitter is generated as a result of the solar cell module included in the power supply device being irradiated with light from the light source. In this case, the illuminance of the solar cell module in accordance with the light from the light source is not uniform, such that the illuminance varies among the plurality of solar cells connected in series in the solar cell module. However, when the output voltage of the solar cell module in the power supply device decreases to the second voltage V2 set as described above, the supplying of electric power from the power supply device to the beacon transmitter is interrupted, so that the occurrence of a reverse bias to a low-performance solar cell is suppressed. As a result, deterioration of the solar cell module is suppressed.

Since the advantages of other aspects of the present invention are apparent from the advantages of the first to twelfth aspects of the present invention and the description related to embodiments to be described below, descriptions thereof will be omitted.

BRIEF DESCRIPTION OF DRAWINGS

FIG. 7 illustrates measurement results of a performance retention rate of the dye-sensitized solar cell module according to the first embodiment.

FIG. 8 illustrates a current-voltage characteristic of the dye-sensitized solar cell module according to the first embodiment.

FIG. 9 illustrates a temporal change in the module voltage for explaining an actual operational example of the power supply device according to the first embodiment.

FIG. 16 illustrates measurement results for checking the relationship among a performance retention rate, a peak voltage, and an open-circuit voltage of the dye-sensitized solar cell module according to the second embodiment.

FIG. 19 illustrates measurement results for checking the relationship among the performance retention rate, the peak voltage, and the open-circuit voltage of a dye-sensitized solar cell module according to a third embodiment.

FIG. 21 includes a plan view (A) illustrating the configuration of a second signboard apparatus as an application example of the communication apparatus including the power supply device according to the present disclosure, and a cross-sectional view (B) taken along line B-B in FIG. 21(A).

DESCRIPTION OF EMBODIMENTS

Embodiments will be described below. A single element functioning as a solar battery will be referred to as "solar cell" or "single cell" hereinafter, and a module packaged by, for example, resin-sealing a plurality of electrically-connected single cells will be referred to as "solar cell module" hereinafter. However, if a plurality of solar cell modules operate as one power generator unit, the plurality of solar cell modules will sometimes be simply referred to as "solar cell module".

1. First Embodiment

<1.1. Overall Configuration>

Figure 1:
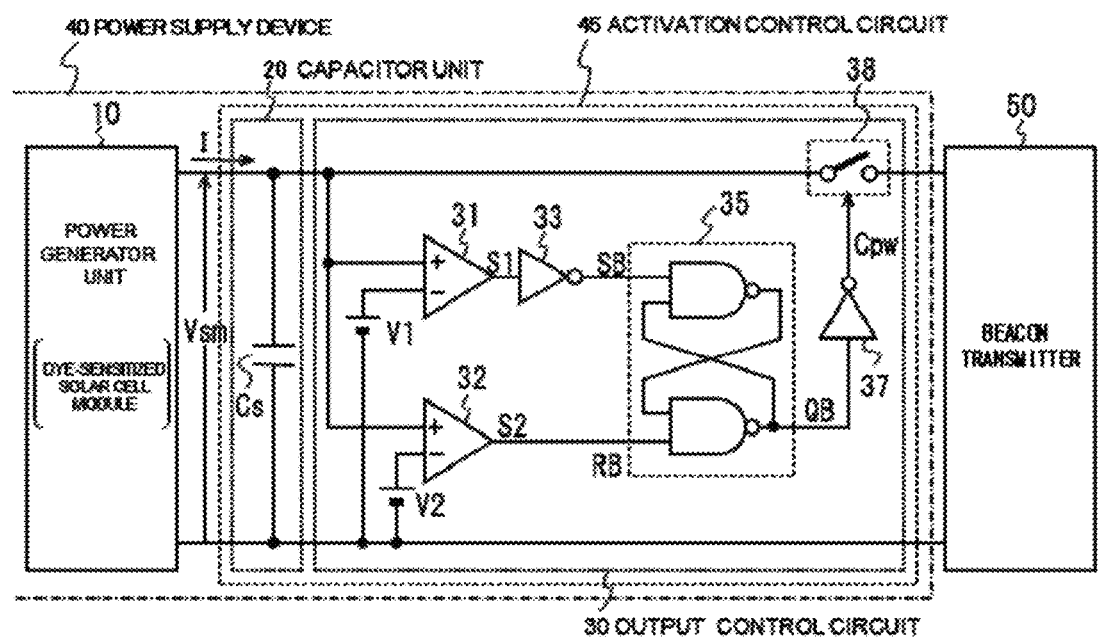
FIG. 1 illustrates the configuration of a communication apparatus including a power supply device according to a first embodiment.

FIG. 1 illustrates the configuration of a communication apparatus including a power supply device according to a first embodiment. This communication apparatus includes a power supply device 40 and a beacon transmitter 50 that is supplied with electric power from the power supply device 40 and that transmits a radio wave for positional confirmation. The power supply device 40 includes a power generator unit 10, a capacitor unit 20, and an output control circuit 30. The capacitor unit 20 and the output control circuit 30 constitute an activation control circuit 45.

Figure 2:
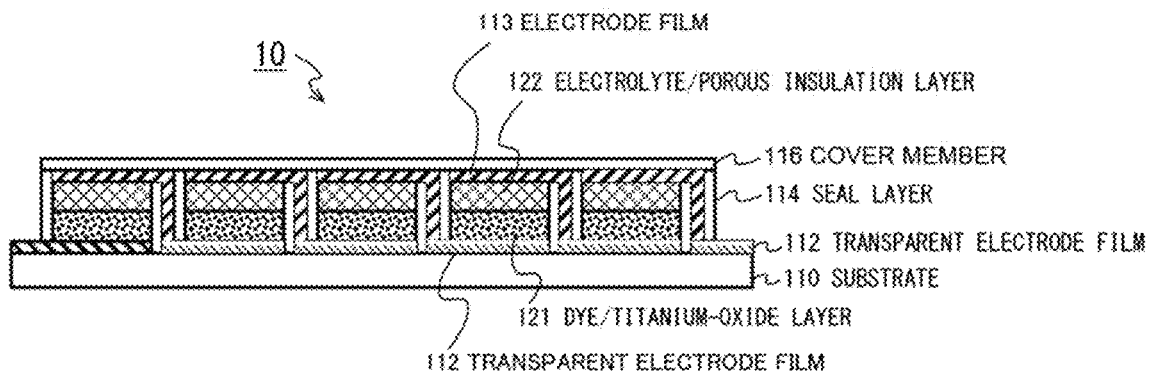
FIG. 2 is a cross-sectional view illustrating a configuration example of dye-sensitized solar cell modules according to the first embodiment.

The power generator unit in is constituted of two dye-sensitized solar cell modules connected to each other in series. FIG. 2 is a cross-sectional view illustrating a configuration example of the dye-sensitized solar cell modules according to this embodiment. Each dye-sensitized solar cell module includes five single cells connected in series, such that the power generator unit 10 is constituted of ten single cells electrically connected in series. As shown in FIG. 2, each single cell is a dye-sensitized solar cell provided on a transparent insulation substrate 110, and is constituted by stacking a titanium oxide layer (referred to as "dye/titanium-oxide layer" hereinafter) 121 serving as a dye-absorbed metal-oxide semiconductor and an electrolyte-impregnated porous insulation layer (referred to as "electrolyte/porous insulation layer" hereinafter) 122 in that order on a transparent electrode film 112 formed on the insulating substrate 110 and then forming another electrode film 113 on the electrolyte/porous insulation layer 122. Seal layers 114 are formed on the side surfaces of the dye/titanium-oxide layer 121 and the electrolyte/porous insulation layer 122 so that each single cell is separated from its neighboring single cells by the seal layers 114. Of the transparent electrode film 112 and the electrode film 113 of each single cell, the transparent electrode film 112 formed on the insulation substrate 110 is electrically connected to the electrode film 113 formed on the electrolyte/porous insulation layer 122 of the neighboring single cell by the transparent electrode film formed along the seal layers 114. Accordingly, the five single cells constituting each solar cell module are connected in series. Moreover, the upper surfaces of the five single cells are covered with a cover member 116.

The structure of the solar cell module 10 according to this embodiment is not limited to the structure shown in FIG. 2 and may have a different structure and may be constituted of different materials so long as the structure includes a plurality of dye-sensitized solar cells as single cells electrically connected in series.

An output end of the power generator unit 10 is connected to the capacitor unit 20. The capacitor unit 20 receives the electric power output from the power generator unit 10 so as to temporarily store electric energy. In this embodiment, the capacitor unit 20 is constituted of six parallel-connected tantalum capacitors (each tantalum capacitor has a capacitance of, for example, 1500 µF) (for the sake of convenience, the six parallel-connected tantalum capacitors will be expressed as "capacitors Cs" hereinafter). By charging and discharging of the capacitors Cs of the cap actor unit 20, an increase or decrease in electric power generated in accordance with a change in illuminance in the solar cell module and an increase or decrease in electric power consumed in the beacon transmitter 50 serving as a load are compensated for, whereby the output voltage of the power supply device 40 is stabilized. In particular, the capacitor unit 20 is effective for complementing the electric power required at the time of activation of the beacon transmitter 50 serving as the load. It is conceivable that the capacitor unit 20 is not required depending on a load that is to be supplied with electric power from the power supply device 40 (e.g., in a case where there is no problem even if an increase or decrease in electric power generated in accordance with a change in illuminance in the solar cell module is directly reflected on the supplying of electric power to the load). In such a case, the capacitor unit 20 does not have to be provided, such that an output voltage Vsm of the power generator unit 10 may be directly applied to the output control circuit 30.

The capacitor unit 20 is not limited to the above-described configuration so long as at can temporarily store the electric power generated by the power generator unit 10. For example, a secondary battery, such as a lithium polymer battery, may be used as the capacitor unit 20 in place of the capacitors Cs. Alternatively, a primary battery, such as a coin battery, may be used in place of a secondary battery. In this case, battery replacement is necessary in the process of using the power supply device 40. However, similar to the case where the capacitors Cs are used or the secondary battery is used, the electric power required at the time of activation of the beacon transmitter 50 can be appropriately complemented.

The output control circuit 30 receives the output voltage Vsm from the power generator unit 10 via the capacitor unit 20. With regard to the output voltage Vsm as a voltage generated by two series-connected solar cell modules in this embodiment, the output voltage Vsm will be referred to as "module voltage" hereinafter regardless of the number of connected solar cell modules. The output control circuit 30 is a circuit for controlling whether or not to supply the module voltage Vsm as a power supply voltage to the beacon transmitter 50 serving as the load of the power supply device 40. Specifically, the output control circuit 30 is a circuit for controlling the supplying/interruption of electric power from the power supply device 40 to the beacon transmitter serving as the load.

In a state where the supplying of electric power to the beacon transmitter 50 is stopped, if the module voltage Vsm becomes higher than a predetermined first voltage V1, the output control circuit 30 starts supplying electric power to the beacon transmitter 50. When the module voltage Vsm subsequently becomes lower than a predetermined second voltage V2 as a voltage lower than the first voltage V1, the output control circuit 30 interrupts the supplying of electric power to the beacon transmitter 50.

Therefore, in this embodiment, as shown in FIG. 1, the output control circuit 30 includes a first constant-voltage source (also denoted by reference sign "V1") that outputs the first voltage V1, a second constant-voltage source (also denoted by reference sign "V2") that output the second voltage V2, a first comparator 31, a second comparator 32, inverters 33 and 37, an RS flip-flop 35, and an on-off switch 38. The first comparator 31 has a positive input terminal that receives the module voltage Vsm, and also has a negative input terminal that receives the first voltage V1. An output signal S1 of the first comparator 31 is logically inverted by the inverter 33 and is input as an inverted set signal SB to the RS flip-flop 35. The second comparator 32 has a positive input terminal that receives the module voltage Vsm, and also has a negative input terminal that receives the second voltage V2. An output signal S2 of the second comparator 32 is input as an inverted reset signal RB to the RS flip-flop 35. The RS flip-flop 35 is constituted of two NAND gates and operates in such a manner that the input signals SB and RB and an output signal QB have the relationship as shown in FIG. 3(A). The output signal QB of the RS flip-flop 35 is logically inverted by the inverter 37 and is input as an on-off control signal Cpw to the on-off switch 38. The on-off switch 38 is turned on when the on-off control signal Cpw is at a high level (H level) and is turned off when the on-off control signal Cpw is at a low level (L level).

Figures 3, 4:
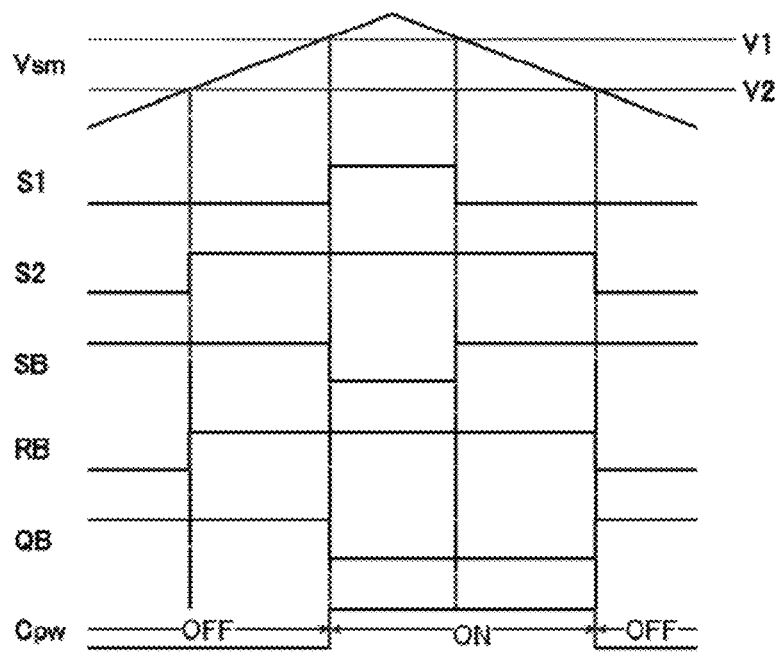
FIG. 3 includes diagrams (A and B) illustrating truth tables for explaining the operation of an output control circuit in the power supply device according to the first embodiment.
FIG. 4 is a signal waveform diagram for explaining the operation of the output control circuit in the power supply device according to the first embodiment.

The output control circuit 30 operates as shown in FIG. 3(B) in accordance with the magnitude relationship among the module voltage Vsm, the first voltage V1, and the second voltage V2. Therefore, when the module voltage Vsm changes from a voltage lower than the second voltage V2 to a voltage higher than the first voltage V1 and then changes to a voltage lower than the second voltage V2, the output signals S1 and S2 of the first and second comparators 31 and 32, the input signals SB and RB of the RS flip-flop 35, and the on-off control signal Cpw change as shown in FIG. 4. As a result, the on-off switch 38 changes from an off state to an on state when the module voltage Vsm increases from the voltage lower than the second voltage V2 and reaches the first voltage. The on-off switch 38 is maintained in the on state until the module voltage Vsm decreases from the voltage higher than the first voltage and reaches the second voltage. The on-off switch 38 is turned off when the module voltage Vsm reaches the second voltage V2.

<1.2. Basic Operation of Power Supply Device>

Figure 5:
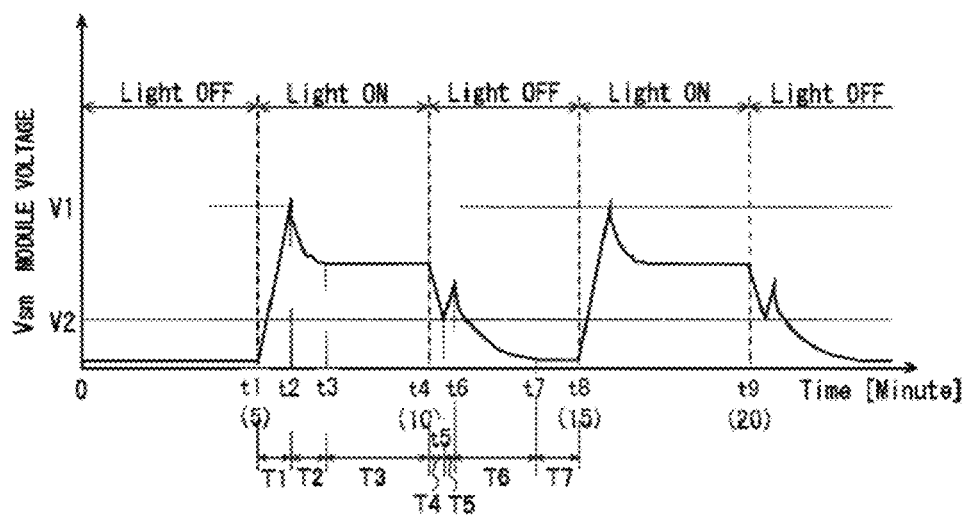
FIG. 5 is a diagram for explaining the basic operation of (an activation control circuit of) the power supply device according to the first embodiment and illustrates a temporal change in a module voltage.

FIG. 5 is a diagram for explaining the basic operation of the power supply device 40 according to this embodiment and illustrates a temporal change in the module voltage Vsm when a state where the solar cell module serving as the power generator unit 10 is irradiated with light (referred to as "light ON state" hereinafter) and a state where the solar cell module serving as the power generator unit 10 is not irradiated with light (referred to as "light OFF state" hereinafter) are alternately repeated.

In the example shown in FIG. 5, the light OFF state is maintained until a time point t1 (=5), the light ON state is maintained from the time point t1 to a time point t4 (=10), the light OFF state is maintained from the time point t4 to a time point t8 (=15), the light ON state is maintained from the time point t8 to a time point t9 (=20), and the light OFF state is maintained from the time point t9 and onward. When the radiation of light onto the solar cell module 10 serving as the power generator unit changes in this manner, the module voltage Vsm changes accordingly as follows.

Since the light OFF state is maintained until the time point t1, the on-off switch 38 in the output control circuit 30 is in an off state, so that the beacon transmitter 50 serving as the load is not supplied with electric power.

In a period T1 between the time points t1 and t2, the solar cell module of the power generator unit 10 receives light and generates electric power so that electric charge is stored in the capacitors Cs of the capacitor unit 20. As a result, the module voltage Vsm as an input voltage of the output control circuit 30 increases and reaches the first voltage V1 (e.g., 4.5 V) at the time point t2. Consequently, the output control circuit 30 turns on the on-off switch 38 at the time point t2 so as to start supplying electric power to the beacon transmitter 50.

Although electric power is supplied from the power generator unit 10 to the beacon transmitter 50 in a period T2 between the time points t2 and t3, the electric charge stored in the capacitors Cs of the capacitor unit 20 is consumed for the electric power used for activating the beacon transmitter 50. As a result, the module voltage Vsm as an input voltage of the output control circuit 30 decreases.

In a period T3 between the time points t3 and t4, the electric power steadily consumed by the beacon transmitter 50 and the electric power generated by the two dye-sensitized solar cell modules serving as the power generator unit 10 balance out, so that the module voltage Vsm is kept constant without changing.

In a period T4 between the time points t4 and t5, the light OFF state is maintained so that the solar cell modules serving as the power generator unit 10 do not generate electric power. As a result, the electric charge stored in the capacitors Cs of the capacitor unit 20 is consumed, thus causing the module voltage Vsm to decrease. At the time point t5, the module voltage Vsm reaches the second voltage V2. Consequently, the output control circuit 30 interrupts the supplying of electric power to the beacon transmitter 50 at the time point t5.

In a period T5 between the time points t5 and t6, the supplying of electric power to the beacon transmitter 50 is interrupted so that electric power is not consumed in the beacon transmitter 50. Thus, the module voltage Vsm instantaneously increases and then decreases.

In a period T6 between the time points t6 and t7, the electric charge stored in the capacitors Cs of the capacitor unit 20 is consumed in accordance with self-discharge within the output control circuit 30 and the solar cell modules, so that the module voltage Vsm continues to decrease. At the time point t7, the electric charge stored in the capacitors Cs of the capacitor unit 20 is completely discharged. As a result, the module voltage Vsm becomes substantially 0 V.

In a period T7 between the time points t7 and t8, the light OFF state is maintained so that the module voltage Vsm is maintained at substantially 0 V. Since the state changes to the light ON state at the time point t8, the solar cell module of the power generator unit 10 resumes the power generating process, so that the module voltage Vsm starts to increase.

<1.3. Settings of First Voltage and Second Voltage in Output Control Circuit>

As described above, in this embodiment, when the module voltage Vsm increases and reaches the first voltage V1 in accordance with power generation by the solar cell modules serving as the power generator unit 10, the output control circuit 30 starts to supply electric power to the beacon transmitter 50 (load). When the module voltage Vsm decreases and reaches the second voltage V2 due to stopped power generation by the solar cell modules or due to a decreased amount of generated power, the supplying of electric power from the output control circuit 30 to the beacon transmitter 50 is interrupted (V1>V2). In this case, the first voltage V1 is set in accordance with, for example, the characteristics or the intended purpose of the load to be supplied with electric power (i.e., the beacon transmitter 50 in this embodiment). With regard to the second voltage V2, an appropriate value is set from the standpoint of preventing deterioration of the single cells included in the dye-sensitized solar cell modules serving as the power generator unit 10. The following description relates to the setting of the second voltage V2.

Figure 6:
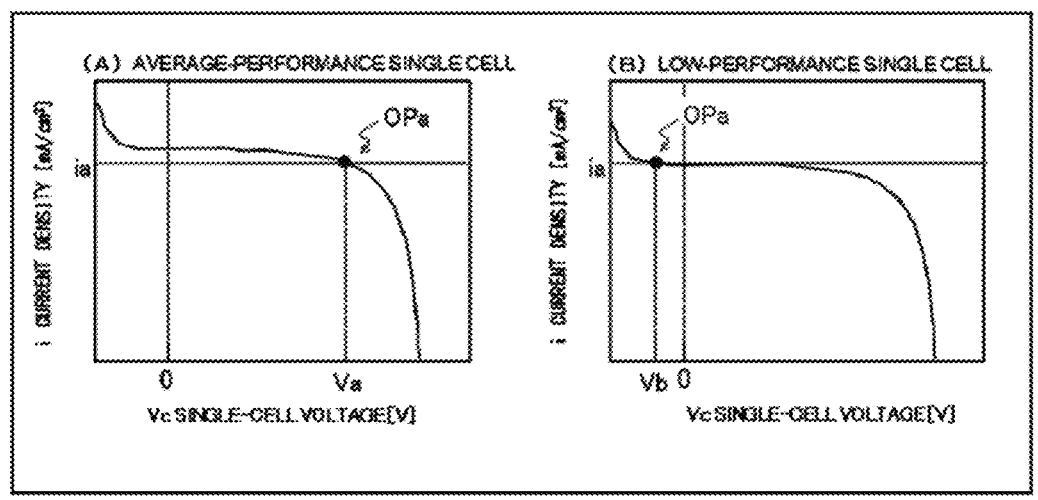
FIG. 6 includes a diagram (A) illustrating a current-voltage characteristic of an average-performance single cell among single cells in the dye-sensitized solar cell module according to the first embodiment, and a diagram (B) illustrating a low-performance single cell.

FIG. 6(A) illustrates the relationship (referred to as "single-cell current-voltage characteristic" or "single-cell i-V characteristic" hereinafter) between a current density i and a voltage Vc (referred to as "single-cell voltage" hereinafter) of an average dye-sensitized solar cell (single cell), and FIG. 6B illustrates the relationship (single-cell i-v characteristic) between a current density i and a single-cell voltage Vc of a low-performance dye-sensitized solar cell. If a low-performance single cell is included in the plurality of (five in this embodiment) single cells constituting each solar cell module, a negative voltage (i.e., a voltage in the opposite direction from the electromotive force of the battery) is applied to the low-performance single cell when the module voltage Vsm is lower than a certain value. In other words, a reverse bias occurs against the low-performance single cell. This is due to the following reasons.

Reference sigh "ia" shown in FIGS. 6(A) and 6(B) denotes an electric current flowing through each solar cell module when the module voltage Vsm is a value (referred to as "minimum voltage value" hereinafter) lower than the aforementioned certain value (this electric current ia will be referred to as "minimum-voltage electric current ia" hereinafter). Because the plurality of single cells included in the solar cell module are connected in series, when the minimum-voltage electric current ia flows through the solar cell module, the minimum-voltage electric current ia also flows through each of the single cells in the solar cell module. As shown in FIG. 6(A), even when the single-cell voltage (single-cell voltage corresponding to an operating point OPa shown in FIG. 6(A)) Va in a case where the minimum-voltage electric current a flows through an average-performance single cell is a positive voltage, if the same minimum-voltage electric current ia flows through a low-performance single cell, a single-cell voltage Vb (i.e., single-cell voltage Vb corresponding to an operating point OPb) becomes a negative value, as shown in FIG. 6(B).

In a dye-sensitized solar cell module, deterioration that involves, for example, dye desorption occurs in a single cell that receives such a negative voltage. Thus, the second voltage V2, which is a voltage that interrupts the supplying of electric power to the beacon transmitter 50 (load) when the module voltage Vsm decreases, should be set such that the performance of the solar cell module does not deteriorate due to deterioration of the single cell receiving the negative voltage (reverse bias). The following description relates to the specific setting of the second voltage V2 in this embodiment.

<1.4. Measurement for Setting Second Voltage>

From the aforementioned standpoint, the present inventor has performed the following measurement for finding an appropriate method for setting the second voltage V2. Specifically, in this measurement, each solar cell module of the power generator unit 10 according to this embodiment with the beacon transmitter 50 serving as a load, as shown in FIG. 1, is irradiated with light by using a solar simulator having an LED (light emitting diode) as a 11 source, and the light emission intensity of the LED is adjusted such that the illuminance of the light is 3000 lx. Under such an evaluation environment, a first practical example, a second practical example, and a third practical example in which the second voltage V2 is set to 1.5 V, 1.2 V, and 2.5 V, respectively, in the configuration according to the above embodiment are set. In each of these practical examples, the maximum output of the power supply device 40 is measured, and a performance retention rate A defined in accordance with the following expression is obtained as a measurement result:

$$A = 100 \times P2/P1 \qquad (1)$$

where P1 denotes a maximum output before the measurement, and P2 denotes a maximum output after six months from the start of the measurement. Although the beacon transmitter 50 used in this embodiment is not limited in particular, in this measurement, a beacon transmitter compliant with BLE (Bluetooth (registered trademark) Low Energy) and manufactured by Braveridge Co., Ltd. (address: 3-27-2 Susenji, Nishi-ku, Fukuoka City, Fukuoka, Japan) is used (the same applies to the measurement in other embodiments to be described later).

As a result of the above-described measurement, results as shown in FIG. 7 are obtained. FIG. 7 also illustrates a comparative example in which the second voltage V2 in the configuration according to this embodiment is set to 1.0 V, and shows a measurement result with respect to this comparative example. As shown in FIG. 7, in the first practical example, the second practical example, and the third practical example in which the second voltage V2 is set to 1.5 V, 1.2 V, and 2.5 V, respectively, the performance retention rate A is 98%, 97%, and 99%, respectively, meaning that there is hardly any deterioration in the solar cell modules of the power generator unit 10. In contrast, in the first comparative example in which the second voltage V2 is set to 1.0 V, the performance retention rate A is 85%, meaning that deterioration in the solar cell modules serving as the power generator unit 10 is observed.

It is clear from the measurement results shown in FIG. 7 that, in this embodiment, a practically satisfactory performance retention rate is obtained by setting the second voltage V2 to a value higher than or equal to 1.2 V. As already described above, in this embodiment, the power generator unit 10 is constituted of two solar cell modules, and each solar cell module is constituted of five series-connected single cells, so that the number (referred to as "series-connected number" hereinafter) N of the series-connected single cells in the power generator unit 10 is ten. Therefore, it is more common that a practically satisfactory performance retention rate is obtained by setting the second voltage V2 [V] to a value indicated by the following expression:

$$V2 \geq 0.12 \times N \ [V] \quad (2)$$

where V2<V1, and since interruption of the supplying of electric power to the beacon transmitter 50 serving as the load should be avoided as much as possible, it is preferable that the second voltage V2 be set to a low value within a range that satisfies the aforementioned expression (2).

<1.5. Operational Example>

The power generator unit 10 according to this embodiment includes two dye-sensitized solar cell modules. FIG. 8 illustrates the relationship (referred to as "power-generator-unit current-voltage characteristic" or "solar cell module current-voltage characteristic" or "solar cell module i-V characteristic" hereinafter) between a density i of electric current flowing through each solar cell module of the power generator unit 10 (=density of electric current flowing through each cell) and a module voltage Vsm, which is an output voltage of the power generator unit 10. In this embodiment, the first voltage V1 is set to, for example, 4.5 V and the second voltage V2 is set to, for example, 1.2 V relative to the solar cell module i-V characteristic.

FIG. 9 illustrates an actual operational example of the power supply device according to this embodiment having the above-described configuration and shows a state where the module voltage Vsm changes in accordance with a change in illuminance environment.

In the operational example shown in FIG. 9, the module voltage Vsm is substantially 0 V at a time point t=0, and there is no electric power supplied to the beacon transmitter 50 serving as the load (referred to as "B-OFF state" hereinafter). Subsequently, when sufficient illuminance is obtained as a result of each solar cell module of the power generator unit 10 being irradiated with light (referred to as "sufficient illuminance state" hereinafter), the module voltage Vsm increases so as to reach the first voltage V1. At this point, the power supply device 40 starts to supply electric power to the beacon transmitter 50 (a state where electric power is supplied from the power supply device 40 to the beacon transmitter 50 will be referred to as "B-ON state" hereinafter). Then, the electric power steadily consumed by the beacon transmitter 50 and the electric power generated in the power generator unit 10 balance out, so that the module voltage Vsm is kept constant without changing.

Subsequently, when the illuminance in each solar cell module decreases due to, for example, a shadow (referred to as "low illuminance state" hereinafter), the electric power generated in the power generator unit 10 in the B-ON state decreases, thus causing the module voltage Vsm to decrease. When the module voltage Vsm decreases to the second Voltage V2, the supplying of electric power from the power supply device 40 to the beacon transmitter 50 is interrupted, whereby the B-OFF state is reached. As a result, the module voltage Vsm starts to increase. When the module voltage Vsm increases to the first voltage V1, the power supply device 40 starts to supply electric power to the beacon transmitter 50 so that the B-ON state is reached, thus causing the module voltage Vsm to decrease in accordance with the supplying of electric power. When the module voltage Vsm decreases to the second voltage V2, supplying of electric power from the power supply device 40 to the beacon transmitter 50 is interrupted, whereby the B-OFF state is reached. During this low illuminance state, the module voltage Vsm alternately repeats increasing and decreasing between the first voltage V1 and the second voltage V2, so that the B-OFF state and the B-ON state are alternately repeated accordingly.

Subsequently, when a sufficient illuminance state is reached, the electric power steadily consumed by the beacon transmitter 50 and the electric power generated in the power generator unit 10 balance out, so that the module voltage Vsm is kept constant without changing.

<1.6. Effects>

It is clear from the above-described operation that, according to this embodiment, when the module voltage Vsm decreases as a result of decreased illuminance caused by, for example, a shadow and the electric power generated by the solar cell module of the power generator unit 10 becoming lower than the electric power consumed by the beacon transmitter 50, the supplying of electric power from the power supply device 40 to the beacon transmitter 50 is interrupted at a point when the module voltage Vsm decreases to the second voltage. Therefore, application of a negative voltage to a low-performance single cell in the solar cell module of the power generator unit 10 (FIG. 6(B)) is suppressed. Consequently, deterioration of the solar cell module can be prevented, whereby a high performance retention rate (i.e., a long performance retention time) can be obtained (see FIG. 7). The beacon transmitter is configured to transmit a radio wave for positional confirmation so that a moving object, such as a vehicle, or a user of a portable telephone can ascertain the current position, and can provide positional information even in a case of intermittent movements.

2. Second Embodiment

<2.1. Overall Configuration and Operation>

Figure 10:
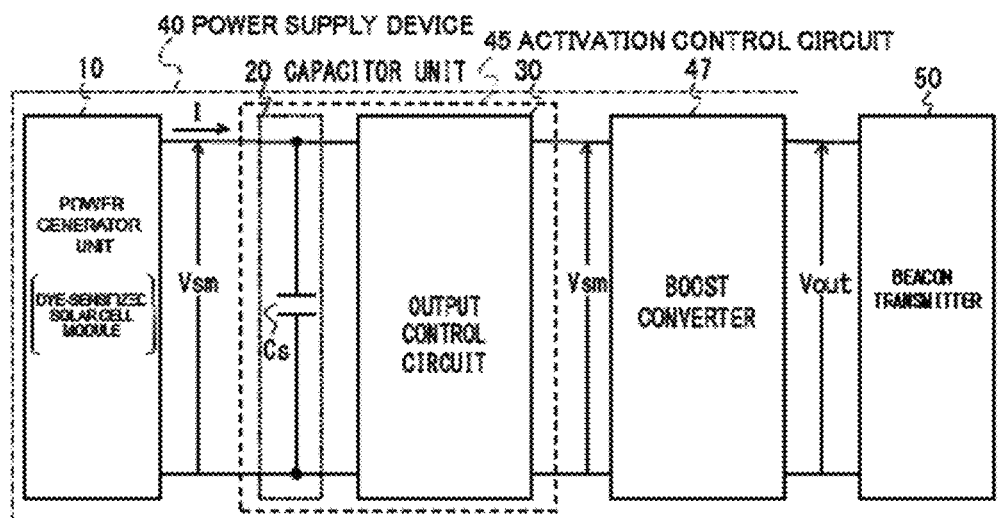
FIG. 10 illustrates the configuration of a communication apparatus including a power supply device according to a second embodiment.

FIG. 10 illustrates the configuration of a communication apparatus including a power supply device according to a second embodiment and the beacon transmitter 50 serving as a load thereof. The power supply device 40 according to this embodiment is similar to that in the first embodiment (see FIG. 1) in that it includes the power generator unit 10 using dye-sensitized solar cells, the capacitor unit 20 realized by the capacitors Cs, and the output control circuit 30. The capacitor unit 20 and the output control circuit 30 constitute the activation control circuit 45. Unlike the first embodiment in which two solar cell modules are used as the power generator unit 10, only one solar cell module is used in the power generator unit 10 according to this embodiment. Similar to the first embodiment, this solar cell module is constituted of five series-connected dye-sensitized solar cells (single cells). In such a configuration, the module voltage Vsm output from the power generator unit 10 is substantially ½ of the module voltage Vsm in the first embodiment. Therefore, the power supply device 40 according to this embodiment includes a boost converter 47 for boosting the level of the module voltage Vsm output from the power generator unit 10 via the capacitor unit 20 and the output control circuit 30 to a voltage level required for the operation of the beacon transmitter 50. Since the remaining configuration in this embodiment is similar to that in the first embodiment, identical or corresponding components will be given identical reference signs, and detailed descriptions thereof will be omitted.

In this embodiment, the number of solar cell modules in the power generator unit 10 is reduced from two to one, so that the load applied to the solar cell module in accordance with the operation of the beacon transmitter 50 is increased. In other words, a single cell with a reverse bias (i.e., a single cell to which a negative voltage is applied) tends to occur more readily, as compared with the first embodiment.

This embodiment is similar to the first embodiment in that, when the module voltage Vsm increases and reaches the first voltage V1, the power supply device 40 starts to supply electric power to the beacon transmitter 50, and when the module voltage Vsm subsequently decreases to reach the second voltage V2, the supplying of electric power from the power supply device 40 to the beacon transmitter 50 is interrupted. However, since only one solar cell module is used in the power generator unit 10 such that the series-connected number N is equal to 5, the first voltage V1 in the output control circuit 30 is set to 2.3 V, and the second voltage V2 is set to 0.6 V in accordance with the aforementioned expression (2). The boost converter 47 is configured to set an output voltage Vout to 3.0 V relative to the set first and second voltages V1 and V2.

Other than the fact that the value of the module voltage Vsm is different, the operation of the power supply device 40 according to this embodiment is basically similar to that in the first embodiment except for the operation of the boost converter 47. Therefore, a detailed description will be omitted (see FIGS. 4, 5, and 9).

<2.2. Setting of Second Voltage>

A method for setting the second voltage V2 in this embodiment will be described below.

Figure 11:
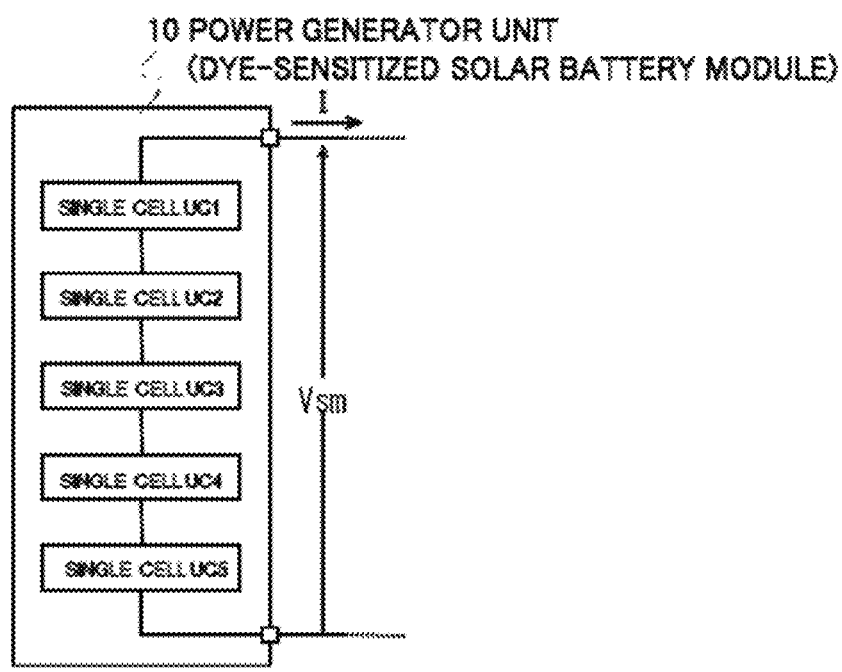
FIG. 11 schematically illustrates an electrical configuration of a dye-sensitized solar cell module according to the second embodiment.

FIG. 11 schematically illustrates an electrical configuration of the solar cell module constituting the power generator unit 10 according to this embodiment. As shown in FIG. 11, five single cells (dye-sensitized solar cells) UC1 to UC5 included in the solar cell module serving as the power generator unit 10 are connected in series. Therefore, an electric current I output from the power generator unit 10 is the same as the electric current flowing through each single cell UCi, and the module voltage Vsm as an output voltage of the power generator unit 10 is the sum of single-cell voltages Vci, which are the voltages of the single cells UCi (i=1 to 5). Specifically, $$Vsm=Vc1+Vc2+Vc3+Vc4+Vc5 \quad (3)$$

Figure 12:
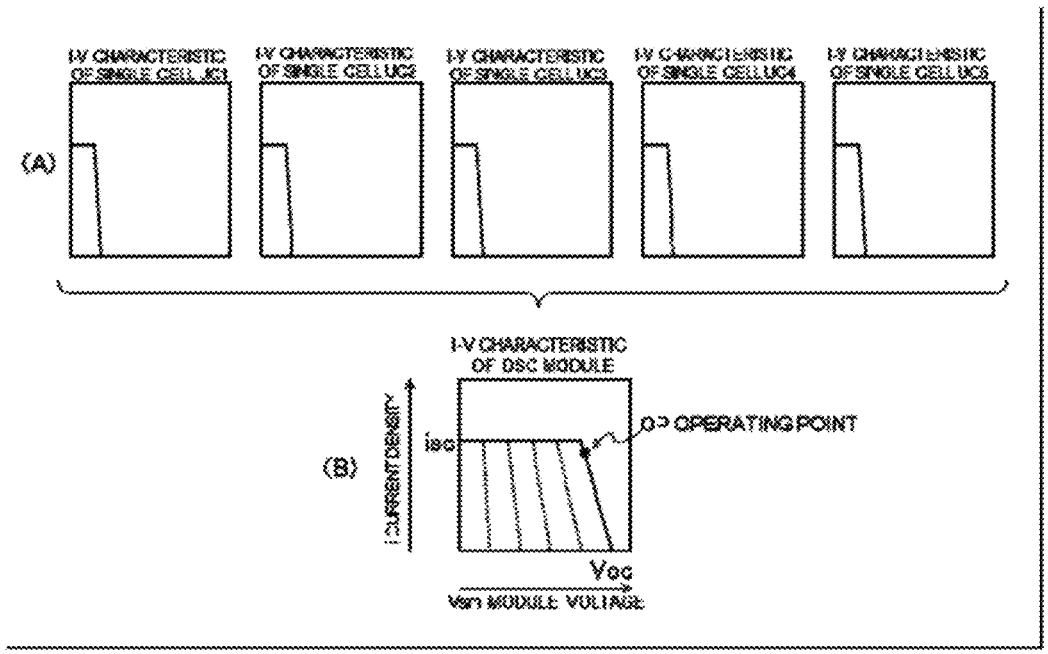
FIG. 12 includes schematic diagrams (A and B) for explaining a current-voltage characteristic of a dye-sensitized solar cell module including only average-performance single cells.

Therefore, in a case where the i-V characteristic of each single cell UCi is as shown in FIG. 12(A), the i-V characteristic of the solar cell module serving as the power generator unit 10 is as shown in FIG. 12(B). An operating point OP in the i-V characteristic shown in FIG. 12(B) is determined in accordance with the value of the module voltage Vsm when electric power is supplied from the power generator unit 10 to the load (i.e., the beacon transmitter in this embodiment), and an electric current corresponding to this operating point OP flows through the load.

Figure 13:
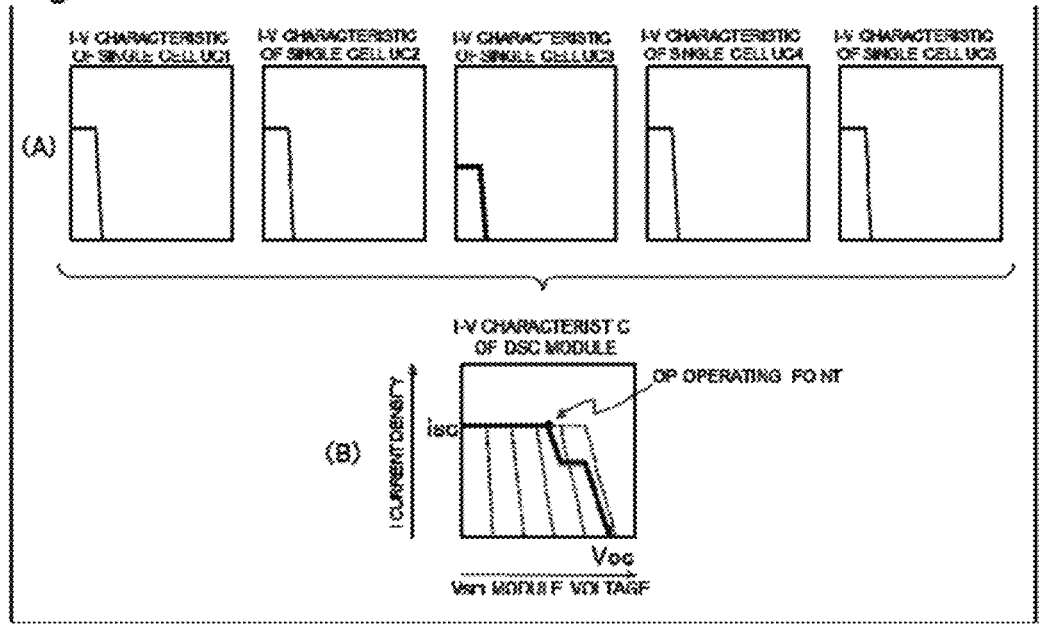
FIG. 13 includes schematic diagrams (A and B) for explaining a current-voltage characteristic of a dye-sensitized solar cell module including a low-performance single cell.

FIG. 13(A) illustrates the i-V characteristics of single cells UCi in a case where any one of the single cells UC1 to UC5 constituting the solar cell module has low performance (in this example, the single cell UC3 has low performance). In this case, the i-V characteristic of the solar cell module serving as the power generator unit 10 has a stepped pattern, as shown in FIG. 13(B). Even when any one of the single cells UC1 to UC5 included in the solar cell module is a low-performance single cell, the i-V characteristic of the solar cell module is as shown in FIG. 13(B) if it even includes one low-performance single cell. It should be noted that, in the characteristic curve shown FIG. 13(B), the stepped pattern is emphasized to provide an easier understanding of the feature of the i-V characteristic of the solar cell module including the low-performance single cell. In a case where the illuminance becomes nonuniform among the single cells UC1 to UC5 constituting the solar cell module, a problem occurs in which at least one of the single cells constituting the solar cell module cannot output a sufficient electric current.

In a case where the power generator unit 10 constituted of the solar cell module having the i-V characteristic in FIG. 13(B) operates at the operating point OP shown in FIG. 13(B), an electric current (referred to as "operational current Ia." hereinafter) corresponding to the operating point OP flows through the single cells UCi (i=1 to 5). It is clear from FIGS. 6(A) and 6(B) that, even when the same operational current Ia flows, if the module voltage Vsm corresponding to the operating point OP is low, only the low-performance single cell UC3 of the single cells UC1 to UC5 in the solar cell module becomes a reverse-biased single cell. Since this low-performance single cell UC3 deteriorates if the reverse-biased state continues, the second voltage V2 is set to suppress this state.

Figure 14:
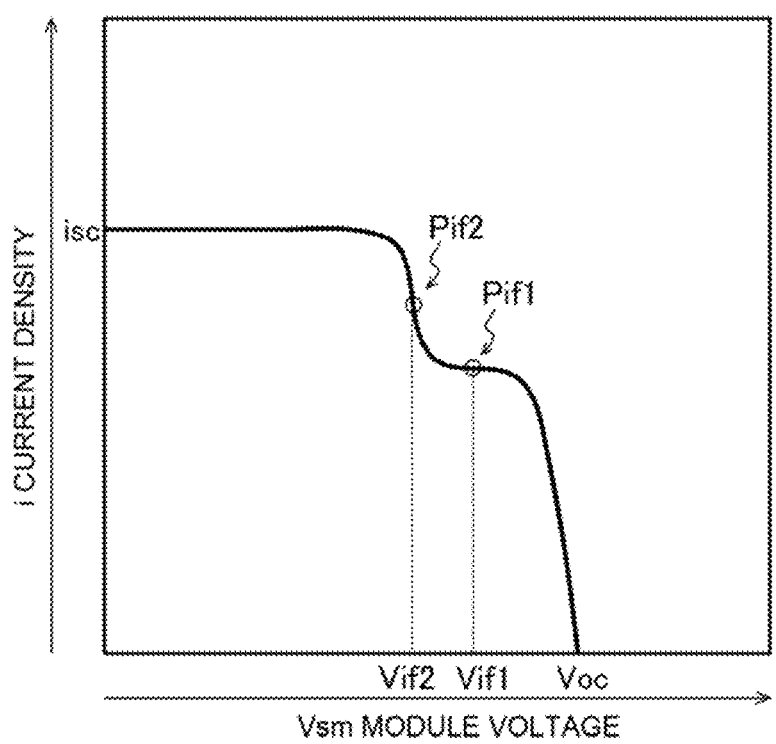
FIG. 14 schematically illustrates a current-voltage characteristic of the dye-sensitized solar cell module for explaining the setting of a second voltage in the second embodiment.

FIG. 14 illustrates the i-V characteristic of the solar cell module shown in FIG. 13(B) in more detail for explaining the setting of the second voltage V2 in this embodiment. As shown in FIG. 14, the i-V characteristic (indicating a curve) of the solar cell module including one low-performance single cell has at least two inflection points Pif1 and Pif2. A module voltage Vsm=Vif1 corresponding to the inflection point Pif1 is higher than a module voltage Vsm=Vif2 corresponding to the inflection point Pif2 (Vif1>Vif2). In view of FIGS. 6(B), 13(A), and 13(B), a minimum voltage that can prevent a reverse bias to the low-performance single cell is higher than the module voltage Vif2. Therefore, in order to suppress deterioration of the low-performance single cell in the solar cell module, the second voltage V2 should be set to a value close to the module voltage Vif2 corresponding to the inflection point Pif2 and higher than the voltage Vif2. Specifically, the second voltage V2 should be set to a value close to the second highest module voltage Vif2 of the module voltages corresponding to the inflection points in the i-V characteristic of the solar cell module and higher than the voltage Vif2. In a case where a dye-sensitized solar cell module is used as the power generator unit 10 as in this embodiment, it is conceivable that the setting of the second voltage V2 corresponds to the aforementioned expression (2).

<2.3. Measurement for Evaluating Solar Cell Module>

Next, with regard to the power supply device 40 according to this embodiment in which the first voltage V1 is set to 2.3 V and the second voltage V2 is set to 0.6 V, the maximum output of the power supply device 40 is measured by using an LED lighting device with respect to each of examples with different individual solar cell modules constituting the power generator unit 10 (referred to as "fourth practical example" to "tenth practical example" hereinafter), and the performance retention rate A defined in accordance with the aforementioned expression (1) is determined as a measurement result. In the measurement, a process of alternately turning on the LED lighting device for five minutes and turning off the LED lighting device for five minutes is repeated such that an illuminance of approximately 5000 lx is obtained in each of the solar cell modules.

Figure 15:
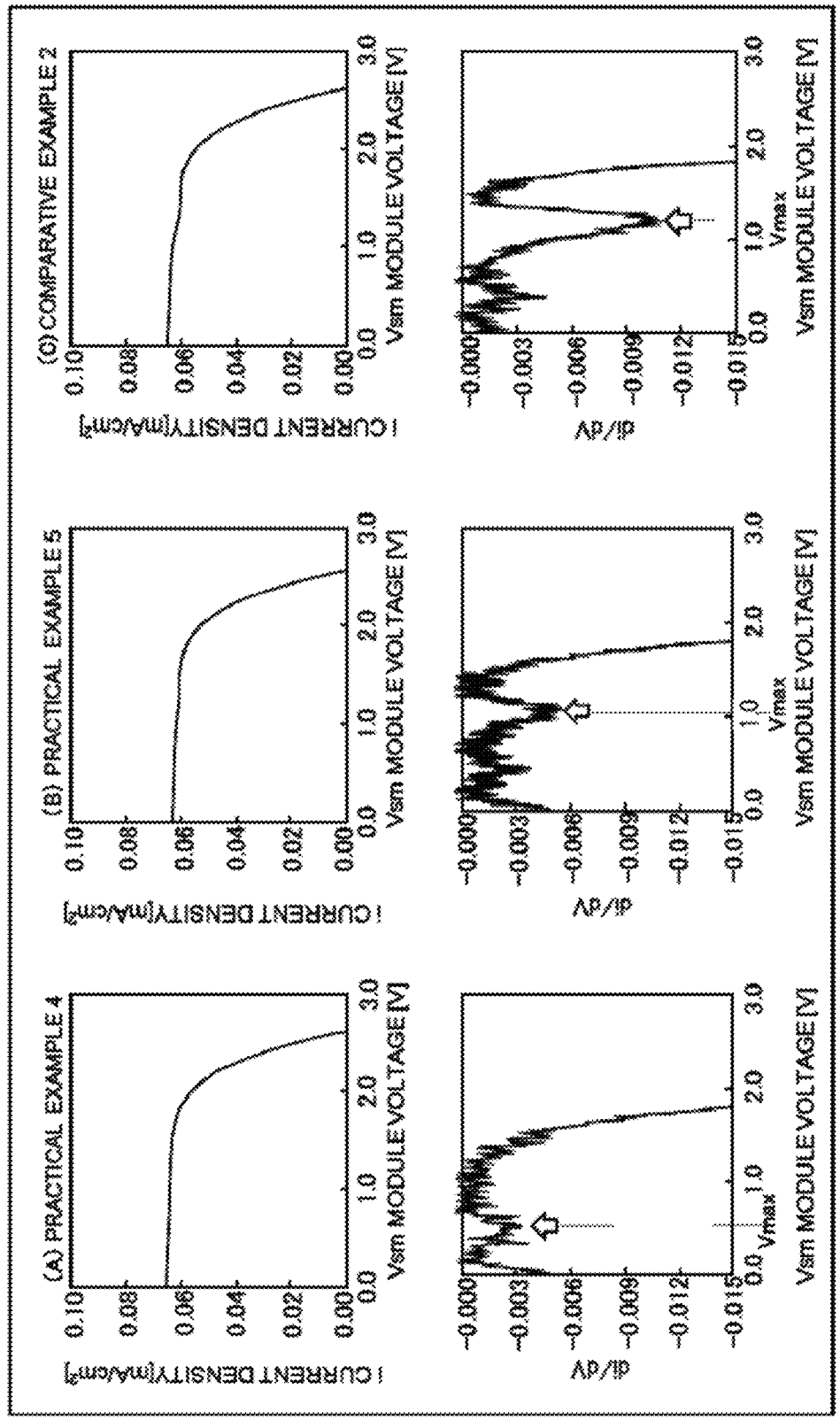
FIG. 15 includes diagrams (A, B, and C) for explaining a peak voltage in the current-voltage characteristic of the dye-sensitized solar cell module.

FIG. 15(A) illustrates an i-V characteristic of the solar cell module according to the fourth practical example subject to the measurement and a differential characteristic of the i-V characteristic, FIG. 15(B) illustrates an i-V characteristic of the solar cell module according to the fifth practical example subject to the measurement and a differential characteristic of the i-V characteristic, and FIG. 15(C) illustrates an i-V characteristic of a solar cell module according to a comparative example subject to the measurement and a differential characteristic of the i-V characteristic. The term "differential characteristic of the i-V characteristic" refers to a characteristic indicating the relationship between the module voltage Vsm and a differential value di/dV according to the module voltage of the density i of electric current flowing through the solar cell module. Specifically, the differential characteristic of the i-V characteristic indicates a variation according to the module voltage Vsm with respect to a gradient (dd/dV) of a curve indicating the i-V characteristic. In the following description, the differential characteristic of the i-V characteristic may sometimes be referred to as "i-V differential characteristic". The i-V differential characteristic shown in each of FIGS. 15(A) to 15(C) includes a high frequency component that changes at a sufficiently small voltage interval, as compared with the first voltage V1 of 2.3 V and the second voltage V2 of 0.6 V, but such a high frequency component will be neglected below.

Specifically, a method for calculating a differential characteristic of an "i-V characteristic" is as follows.

First, the current density i when the module voltage Vsm is changed from −0.1 V to 3.9 V at an interval of 0.005 V is measured so as to determine the i-V characteristic. Then, when the differential characteristic is to be determined, in order to reduce noise occurring due to a measurement error in the measured current density i, a differential value di/dV with respect to a predetermined module voltage Vsm is calculated by using an average value of current densities i at five points near the module voltage Vsm. With regard to this point, for example, a method for calculating the differential value di/dV when the module voltage Vsm is 1.000 V will be described in detail.

First, as an average value of current densities i when the module voltage Vsm is 0.995 V (i.e., average current density at 0.995 V), an average value of nine values indicating current densities i when the module voltage Vsm is 0.975 V, 0.980 V, 0.985 V, 0.990 V, 0.995 V, 1.000 V, 1.005 V, 1.010 V, and 1.015 V is determined. Likewise, an average value of current densities i when the module voltage Vsm is 1.000 V (i.e., average current density at 1.000 V) is determined. Then, a current density difference Δi is determined by subtracting the determined "average current density at 0.995 V" from the determined "average current density at 1.000 V". By dividing the current density difference Δi by 0.005 V, which a voltage difference ΔV between 1.000 V and 0.995 V, a differential value di/dV is calculated.

In each of FIGS. 15(A) to 15(C), an arrow indicates a peak corresponding to a maximum absolute peak value among peaks in the i-V differential characteristic. This peak is called a "maximum differential peak", a module voltage Vsm corresponding to this maximum differential peak is called a "peak voltage Vmax", and a differential value di/dV at this maximum differential peak is called a "maximum differential peak value (di/dV)max". The term "peak" refers to a point at which di/dV is at maximum or minimum in the i-V differential characteristic, and the term "peak value" refers to a maximum value or a minimum value in the i-V differential characteristic. The maximum differential peak in the i-V differential characteristic shown in each of FIGS. 15(A) to 15(C) corresponds to an inflection point at which the corresponding module voltage Vsm is the second highest among the inflection points in the i-V characteristic (see the inflection point. Pif2 in the i-V characteristic shown in FIG. 14).

FIG. 16 illustrates results of the measurement according to this embodiment. In FIG. 16, reference sign N denotes the series-connected number in the power generator unit 10, that is, the number of single cells connected in series in the power generator unit 10, and "(N−3)/N" in "Vocx(N−3)/N" indicates a rate for taking into consideration the effect of a reverse bias caused by a low-performance single cell being included in a solar cell module. In this embodiment, N is equal to 5.

The following findings are obtained in accordance with the measurement results shown in FIG. 16.

(First Finding) According to the measurement results of the fourth to tenth practical examples, when the absolute value of the maximum differential peak value (di/dV)max is lower than or equal to $6.9 \times 10^{-3}$ mA/(cm$^2$·V), the performance retention rate A is 93% or higher. In contrast, according to the measurement results of second to sixth comparative examples, when the absolute value of the maximum differential peak value (di/dV)max is higher than or equal to $9.7 \times 10^{-3}$, the performance retention rate A is 89% or lower. Therefore, deterioration of a dye-sensitized solar cell module can be suppressed so long as the absolute value of the maximum differential peak value (di/dV)max is lower than or equal to $6.9 \times 10^{-3}$ mA/(cm$^2$·V).

(Second Finding) According to the measurement results of the fifth to ninth practical examples, when the absolute value of the maximum differential peak value (di/dV)max is lower than or equal to $6.9 \times 10^{-3}$ mA/(cm$^2$·V) and the peak voltage Vmax is higher than or equal to "Vocx(N−3)/N", the performance retention rate A is 96% or hither. Therefore, deterioration of a dye-sensitized solar cell module can be further suppressed when the absolute value of the maximum differential peak value (di/dV)max is lower than or equal to $6.9 \times 10^{-3}$ mA/(cm$^2$·V) and the peak voltage Vmax is higher than or equal to "Vocx(N−3)/N".

In order to actually utilize the above-described findings, for example, it is preferable that a solar cell module that satisfies the conditions indicated in the above-described (first finding) and (second finding) be selected from manufactured solar cell modules and be used in the power generator unit 10.

<2.4. Effects>

This embodiment is similar to the first embodiment in that, when the module voltage Vsm decreases to the second voltage V2 as a result of decreased illuminance in the solar cell module serving as the power generator unit 10, the supplying of electric power from the power supply device 40 to the beacon transmitter 50 serving as the load is interrupted. In this embodiment, the second voltage V2 is set to a value higher than the second highest module voltage Vif2 of the module voltages corresponding to the inflection points in the i-V characteristic of the solar cell module (see FIG. 14). Consequently, a reverse bias to the low-performance single cell included in the solar cell module is suppressed, so that deterioration of the solar cell module is suppressed more reliably, whereby a high performance retention rate can be obtained.

Furthermore, in this embodiment, a dye-sensitized solar cell module in which the absolute value of the maximum differential peak value (di/dV)max is lower than or equal to $6.9 \times 10^{-3}$ mA/(cm²·V) is used in the power generator unit 10, so that deterioration of the dye-sensitized solar cell module can be suppressed. Moreover, a dye-sensitized solar cell module in which the absolute value of the maximum differential peak value (di/dV)max is lower than or equal to $6.9 \times 10^{-3}$ mA/(cm²·V) and the peak voltage Vmax is higher than or equal to "Voc×(N−3)/N" is used in the power generator unit 10, so that deterioration of the dye-sensitized solar cell module can be further suppressed.

3. Third Embodiment

<3.1. Overall Configuration and Operation>

Figure 17:
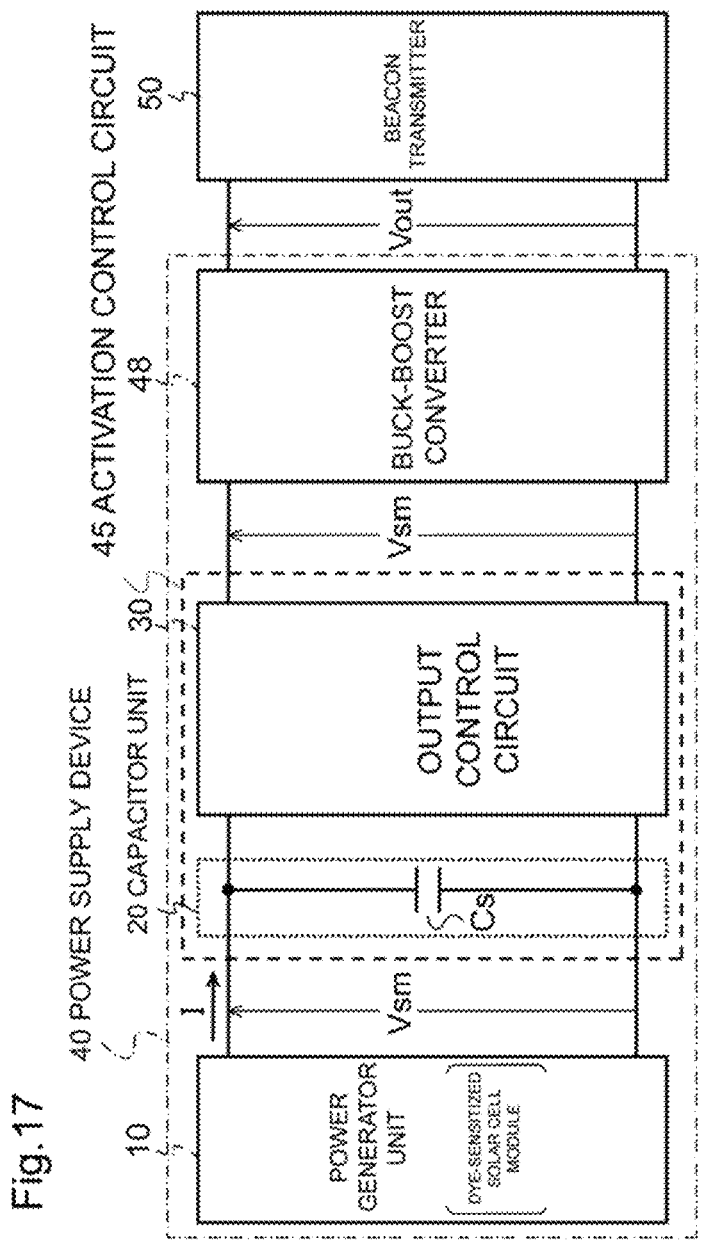
FIG. 17 illustrates the configuration of a communication apparatus including a power supply device according to a third embodiment.

FIG. 17 illustrates the configuration of a communication apparatus including a power supply device according to a third embodiment and the beacon transmitter 50 serving as a load thereof. The power supply device 40 according to this embodiment is similar to that in the second embodiment (see FIG. 1) in that it includes the power generator unit 10 using dye-sensitized solar cells, the capacitor unit 20 realized by the capacitors Cs, and the output control circuit 30. The capacitor unit 20 and the output control circuit 30 constitute the activation control circuit 45. Unlike the second embodiment in which one solar cell module is used as the power generator unit 10, the number of solar cell modules (referred to as "usable module number" hereinafter) used in the power generator unit 10 according to this embodiment is changeable in the range of one to three. Correspondingly, the power supply device 40 according to this embodiment includes a buck-boost converter 48 in place of the boost converter 47 according to the second embodiment. Although the usable module number ranges between one and three in this embodiment, the usable module number may be four or more.

In this embodiment, in a case where the usable module number is one (i.e., in a case where the series-connected number N is equal to 5), the first voltage V1 is set to 2.3 V and the second voltage V2 is set to 0.6 V in accordance with the aforementioned expression (2). In a case where the usable module number is two (i.e., in a case where the series-connected number N is equal to 10), the first voltage V1 is set to 4.5 V and the second voltage V2 is set to 1.2 V in accordance with the aforementioned expression (2). In a case where the usable module number is three (i.e., in a case where the series-connected number N is equal to 15), the first voltage V1 is set to 7.0 V and the second voltage V2 is set to 2.0 V in view of the aforementioned expression (2). The buck-boost converter 48 is configured to cope with such differences in the set values of the first and second voltages V1 and V2 caused by the usable module number, and outputs an output voltage Vout of 3.0 V to the beacon transmitter 50 regardless of the usable module number.

Other than the fact that the value of the module voltage Vsm is different, the operation of the power supply device 40 according to this embodiment is basically similar to that in the first embodiment except for the operation of the buck-boost converter 48. Therefore, a detailed description will be omitted (see FIGS. 4, 5, and 9).

<3.2. Measurement for Evaluating Solar Cell Module>

Next, with regard to the power supply device 40 according to this embodiment in which the first and second voltages V1 and V2 are set in accordance with the usable module number, as described above, the maximum output of the power supply device 40 according to this embodiment is measured under the same irradiation conditions as in the measurement according to the second embodiment. The measurement is performed with respect to fifth to ninth practical examples identical to those in the second embodiment in which the usable module number is one (N=5) and different individual solar cell modules are used, eleventh and twelfth practical examples in which the usable module number is two (N=10) and different solar cell modules are used, and thirteenth and fourteenth practical examples in which the usable module number is three (N=15) and different individual solar cell modules are used. The performance retention rate A defined in accordance with the aforementioned expression (1) is determined as a measurement result (it should be noted that the measurement is not performed again for the fifth to ninth practical examples since the measurement conditions are the same as those in the second embodiment, such that the measurement results in the second embodiment are reused).

Figure 18:
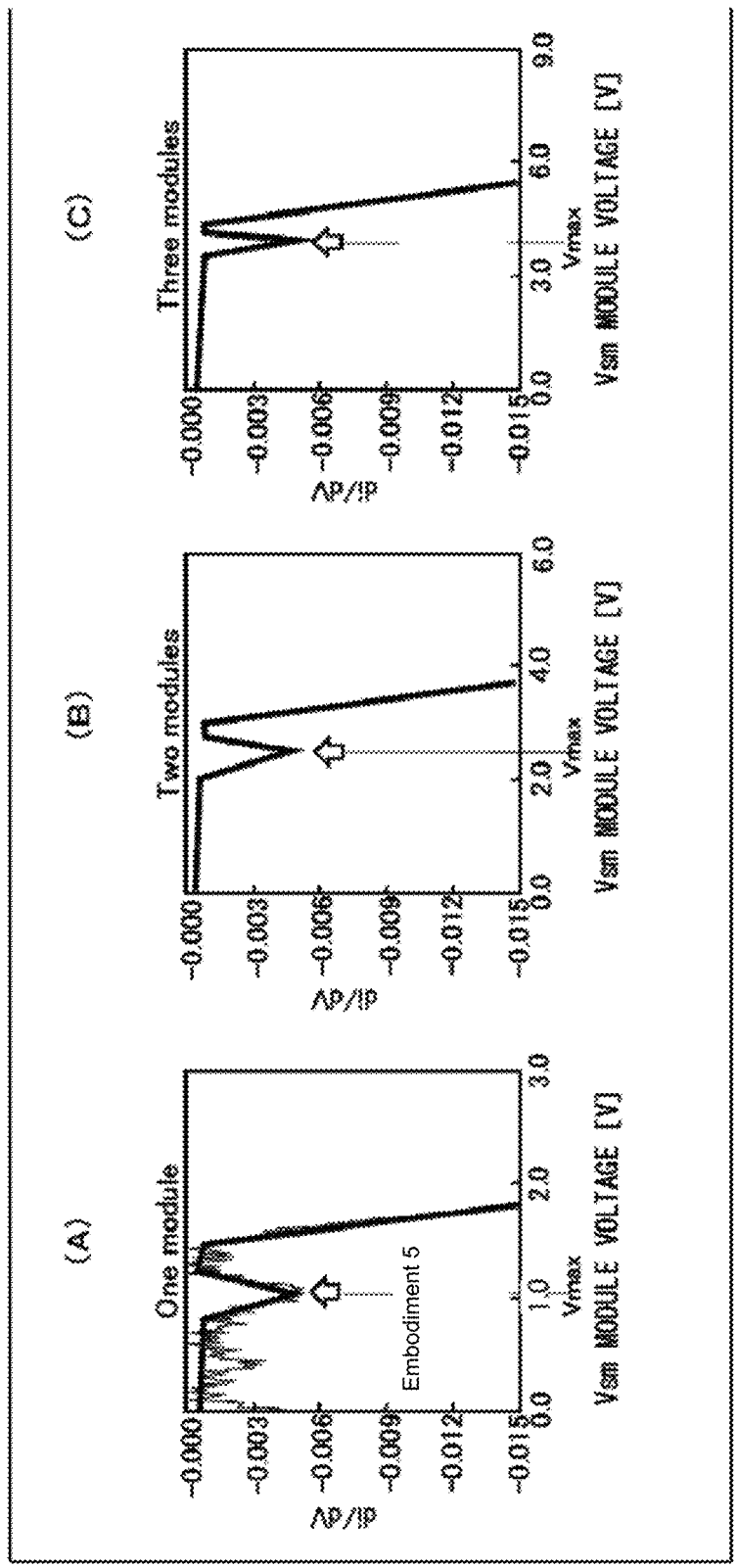
FIG. 18 includes diagrams (A, B, and C) illustrating peak voltages in a case where the number of dye-sensitized solar cell modules is varied.

FIG. 18(A) illustrates an i-V differential characteristic of the power generator unit 10 in a case where the usable module number is one (N=5) (specifically, the fifth practical example), FIG. 18(B) illustrates an i-V differential characteristic of the power generator unit 10 in a case where the usable module number is two (N=10), and FIG. 18(C) illustrates an i-V differential characteristic of the power generator unit 10 in a case where the usable module number is three (N=15). In each of FIGS. 18(A) to 18(C), an arrow indicates a maximum differential peak in the i-V differential characteristic. The single cells in the solar cell module used as the power generator unit 10 should all have the same i-V characteristic. In an actual power supply device 40, the single cells in the solar cell module used as the power generator unit 10 try to achieve substantially uniform performance, but low performance is confirmed in about one of these single cells due to, for example, contamination. Based on this assumption, the present inventor has discovered from the i-V differential characteristic shown in each of FIGS. 18(A) to 18(C) that there is a predetermined correlative relationship between a peak voltage Vmax and an open-circuit voltage Voc of the power generator unit 10.

FIG. 19 illustrates results of the measurement with regard to the fifth to ninth practical examples and the eleventh to fourteenth practical examples according to this embodiment. In FIG. 19, reference sign N denotes the series-connected number in the power generator unit 10, and N=5, N=10, and N=15 correspondingly indicate that the series-connected number is one, two, and three, respectively. The aforementioned correlative relationship is expressed by the relationship between the open-circuit voltage Voc and Voc×(N−3)/N shown in FIG. 19. Specifically, assuming that the first and second voltages V1 and V2 (the second voltage V2 in particular) are appropriately set, if the peak voltage Vmax is higher than Voc×(N−3)/N, the performance retention rate A is 95% or higher and is sufficiently high. In this case, it is conceivable that there is only one low-performance single cell among the single cells included in the solar cell module serving as the power generator unit 10. Furthermore, the fifth to ninth practical examples and the eleventh to fourteenth practical examples corresponding to this case all satisfy one of required conditions obtained from the measurement results (FIG. 16) in the second embodiment, that is, the condition "the absolute value of the maximum differential peak value (di/dV)max is lower than or equal to $6.9 \times 10^{-3}$ mA/(cm²·V)". In contrast, with regard to the fourth example and the tenth example in the measurement results (FIG. 16) in the second embodiment, the absolute value of the maximum differential peak value (di/dV) max is lower than or equal to $6.9 \times 10^{-3}$ mA/(cm²·V), but the peak voltage Vmax is lower than Voc×(N−3)/N. In this case, it is conceivable that there are two or more low-performance single cells among the single cells included in the solar cell module serving as the power generator unit 10, or that the degree of reduced performance is large even if there is only one low-performance single cell.

In order to actually utilize the above-described finding, for example, it is conceivable to determine whether or not one solar cell module or a plurality of series-connected solar cell modules to be used as the power generator unit 10 satisfies the condition "the absolute value of the maximum differential peak value (di/dV)max is lower than or equal to $6.9 \times 10^{-3}$ mA/(cm$^2$·V)", as well as the condition "the peak voltage Vmax is higher than Voc×(N−3)/N", and if both conditions are not satisfied, the one solar cell module or at least one of the plurality of series-connected solar cell modules to be used may be determined as being defective and may be replaced with another one.

<3.3. Effects>

According to the above-described embodiment, even in a case where a plurality of solar cell modules are used as the power generator unit 10, if the condition "the absolute value of the maximum differential peak value (di/d)max is lower than or equal to $6.9 \times 10^{-3}$ mA/(cm$^2$·V)" and the condition "the peak voltage Vmax is higher than Voc×(N−3)/N" are satisfied, deterioration of the dye-sensitized solar cell modules serving as the power generator unit 10 can be sufficiently suppressed, as in the second embodiment, whereby a high performance retention rate can be achieved.

4. Application Examples

Next, a signboard apparatus in which the communication apparatus including the power supply device according to the present disclosure is incorporated will be described as an application example of the communication apparatus.

<4.1. First Signboard Apparatus>

Figure 20:
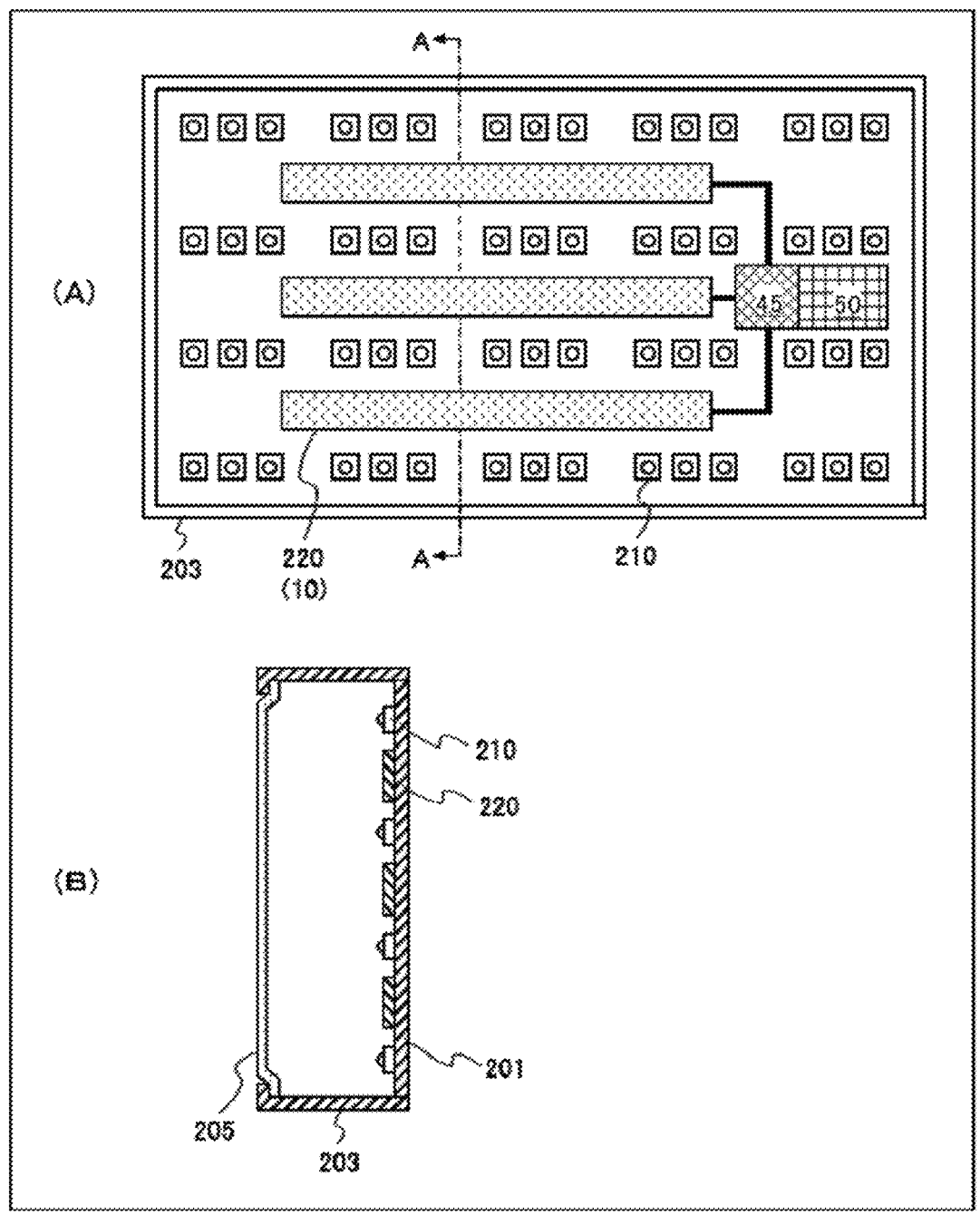
FIG. 20 includes a view (A) illustrating the configuration of a first signboard apparatus as an application example of the communication apparatus including the power supply device according to the present disclosure, and a cross-sectional view (B) taken along line A-A in FIG. 20(A).

FIG. 20 illustrates the configuration of a first signboard apparatus as an application example of the communication apparatus including the power supply device according to the present disclosure. Specifically, FIG. 20(A) is a plan view illustrating the interior of the signboard apparatus, and FIG. 20(B) is a cross-sectional view taken along line A-A in FIG. 20(A). This signboard apparatus is an internally-illuminated signboard apparatus and has a flat rectangular-parallelepiped housing constituted of a base board 201, a side frame 203, and a display board 205 serving as an upper board composed of a light diffusing material. The base board 201 has a plurality of rows of LEDs 210 (four rows in this embodiment) arranged as light sources. A drive circuit and a power supply circuit for these LEDs 210 and wires therebetween are not shown.

As shown in FIGS. 20(A) and 20(B), this signboard apparatus includes three dye-sensitized solar cell modules 220 as a power generator unit attached between the rows of the LEDs 210 on the base board 201, an activation control circuit 45 electrically connected to the solar cell modules 220, and a beacon transmitter 50. Where necessary, a boost converter or a buck-boost converter is provided between the activation control circuit 45 and the beacon transmitter 50 (see FIGS. 10 and 17). The activation control circuit 45 shown in FIG. 20(A) has a configuration similar to that of the activation control circuit 45 constituted of the capacitor unit 20 and the output control circuit 30 shown in FIG. 1. Accordingly, this signboard apparatus contains a communication apparatus including any one of the power supply devices 40 according to the above embodiments and the beacon transmitter 50.

In this signboard apparatus, the electric power output from the solar cell modules 220 serving as the power generator unit 10 is applied to the beacon transmitter 50 via the activation control circuit 45, and the beacon transmitter 50 operates in accordance with this electric power. As mentioned above, the output control circuit in the activation control circuit 45 controls the start and interruption of the supplying of electric power to the beacon transmitter 50 in accordance with the module voltage Vsm based on the first and second voltages V1 and V2. Accordingly, similar to the above embodiments, deterioration of each solar cell module 220 caused due to a low-performance single cell being included in the solar cell module is suppressed.

In such a signboard apparatus, the solar cell modules 220 are disposed so as to be capable of receiving light directly or indirectly from the LEDs 210. However, the positional relationship between the single cells included in each solar cell module 220 and the LEDs 210 varies from single cell to single cell. As a result, the illuminance in each solar cell module 220 is not uniform, meaning that the illuminance varies from single cell to single cell. Therefore, even when a low-performance single cell is not included in the series-connected single cells in each solar cell module 220, that is, even when all of the single cells have substantially the same performance, the i-V characteristic of a single cell with low illuminance is poorer than the i-V characteristics of the other single cells. As a result, similar to a case where there is a low-performance single cell included in a solar cell module, the i-V characteristic of the solar cell module has a stepped pattern, as shown in FIGS. 13(B) and 14. However, in this signboard apparatus, the start and interruption of the supplying of electric power to the beacon transmitter 50 are controlled in accordance with the module voltage Vsm based on the first and second voltages V1 and V2 (see FIGS. 4 and 9), as in the above embodiments, so that deterioration of each solar cell module 220 caused due to nonuniform illuminance in the solar cell module 220 can be suppressed. The expression "light is receivable indirectly from the LEDs 210" means that reflected light or scattered light obtained as a result of the light from the LED 210 being internally reflected in the signboard apparatus, such as at the side frame 203 or the display board 205, can be received.

Therefore, according to this signboard apparatus, the beacon transmitter 50 contained therein can operate satisfactorily over a long period of time. For example, in in an underground district where a radio wave from a GPS (global positioning system) satellite is not reachable, if the underground district is provided with this signboard apparatus, a user of a portable telephone or smartphone having a GPS function is capable of ascertaining the current position by allowing the portable telephone to receive the radio wave from the beacon transmitter 50 within the signboard apparatus. Furthermore, according to this signboard apparatus, the light sources used for illuminating the signboard apparatus are effectively utilized to activate the beacon transmitter 50 within the signboard apparatus, so that an additional power source for activating the beacon transmitter is not necessary, thereby contributing to energy conservation. Moreover, by providing the beacon transmitter 50 within the signboard apparatus, it is not necessary to provide an additional transmitter, a power source for activating the transmitter, and wires in the underground district, thereby saving space. Furthermore, since the display board 205 is provided inside, the solar cell modules 220 and the beacon transmitter 50 can be hidden, whereby the beacon transmitter 50 can be installed without impairing the design properties of the signboard apparatus and the design (external appearance) of the installation environment.

Since dye sensitizer solar cell modules are used for generating electric power for the operation of the beacon transmitter 50 contained in the signboard apparatus, the power generating properties thereof have low dependence on the illuminance. Therefore, even in a case where the light from the light sources within the signboard apparatus is utilized, as in this application example, practically sufficient electric power can be obtained.

<4.2. Second Signboard Apparatus>

FIG. 21 illustrates the configuration of a second signboard apparatus as an application example of the communication apparatus including the power supply device according to the present disclosure. Specifically, FIG. 21(A) is a plan view illustrating the interior of the signboard apparatus, and FIG. 21(B) is a cross-sectional view taken along line B-B in FIG. 21(A). This signboard apparatus is also an internally-illuminated signboard apparatus and has a flat rectangular-parallelepiped housing constituted of a base board 301, a side frame 303, and a display board 305 serving as an upper board composed of a light diffusing material. The base board 301 has three fluorescent lamps 310 arranged parallel to one another with gaps therebetween. A drive circuit and a power supply circuit for the fluorescent lamps 310 and wires therebetween are not shown.

As shown in FIGS. 21(A) and 21(B), this signboard apparatus includes two dye sensitized solar cell modules 320 serving as a power generator unit attached between the fluorescent lamps 310 on the base board 301, an activation control circuit 45 electrically connected to the solar cell modules 320, and a beacon transmitter 50. Where necessary, a boost converter or a buck-boost converter is provided between the activation control circuit 45 and the beacon transmitter 50 (see FIGS. 10 and 17). The activation control circuit 45 shown in FIG. 21(A) has a configuration similar to that of the activation control circuit 45 constituted of the capacitor unit 20 and the output control circuit 30 shown in FIG. 1. Accordingly, this signboard apparatus similarly contains a communication apparatus including any one of the power supply devices 40 according to the above embodiments and the beacon transmitter 50.

In this signboard apparatus, the electric power output from the solar cell modules 320 serving as the power generator unit 10 is similarly applied to the beacon transmitter 50 via the activation control circuit 45, and the beacon transmitter 50 operates in accordance with this electric power. As mentioned above, the output control circuit in the activation control circuit 45 controls the start and interruption of the supplying of electric power to the beacon transmitter 50 in accordance with the module voltage Vsm based on the first and second voltages V1 and V2. Accordingly, similar to the above embodiments, deterioration of each solar cell module 320 caused due to a low-performance single cell being included in the solar cell module is suppressed.

In such a signboard apparatus, the solar cell modules 320 are similarly disposed so as to be capable of receiving light directly or indirectly from the fluorescent lamps 310. However, the positional relationship between the single cells included in each solar cell module 320 and the fluorescent lamps 310 as light sources varies from sing e cell to single cell. Thus, the illuminance varies from single cell to single cell. Therefore, even when a low-performance single cell is not included among the series-connected single cells in each solar cell module 320, the i-V characteristic of a single cell with low illuminance is poorer than the i-V characteristics of the other single cells. As a result, similar to a case where there is a low performance single cell included in a solar cell module, the i-V characteristic of the solar cell module has a stepped pattern, as shown in FIGS. 13(B) and 14. However, in this signboard apparatus, the start and interruption of the supplying of electric power to the beacon transmitter 50 are controlled in accordance with the module voltage Vsm based on the first and second voltages V1 and V2 (see FIGS. 4 and 9), as in the above embodiments, so that deterioration of each solar cell module 320 caused due to nonuniform illuminance in the solar cell module 320 can be suppressed.

Therefore, according to this signboard apparatus, the beacon transmitter 50 contained therein can operate satisfactorily over a long period of time, and can achieve effects similar to those of the first signboard apparatus.

5. Modifications

The present invention is not limited to the above embodiments, and various modifications are permissible within the scope of the invention.

For example, although the power generator unit 10 uses a dye-sensitized solar cell module or modules in each of the above embodiments, the present invention is not limited to this. Specifically, even in a configuration that, uses a solar cell module other than a dye-sensitized solar cell module, if the solar cell module is constituted of a plurality of series-connected single cells, the present invention is applicable in a case where the plurality of single cells may possibly include a low-performance cell or in a case where the illuminance may vary among the plurality of single cells. Specifically, for example, the method of setting the second voltage V2 shown in FIG. 14 (i.e., the setting method based on inflection points of a characteristic curve) or the deterioration suppression method based on the condition "peak voltage Vmax is higher than Voc×(N−3)/N" can be used when a solar cell module other than a dye-sensitized solar cell module is used.

Furthermore, as an alternative to each of the above embodiments in which the power supply device 40 using a solar battery is connected to the beacon transmitter 50 serving as the load (see FIGS. 1, 10, and 17), the present invention is also applicable to a case where the power supply device 40 is connected to another electronic device serving as a load in place of the beacon transmitter 50.

6. Other Features

The present application claims priority based on Japanese Patent Application No. 2016-035805, titled "POWER. SUPPLY DEVICE USING SOLAR BATTERY, ELECTRONIC APPARATUS, SUCH AS COMMUNICATION APPARATUS, EQUIPPED WITH THE SAME, AND SIGNBOARD APPARATUS", filed Feb. 26, 2016. The contents of this Japanese application are incorporated in this application by reference in their entirety.

REFERENCE SIGNS LIST 10 power generator unit (dye-sensitized solar cell module)
20 capacitor unit (capacitor)
30 output control circuit
40 power supply device
45 activation control circuit
47 boost converter
48 buck boost converter 50 beacon transmitter
210 LED (light source)
310 fluorescent lamp (light source)
220, 320 solar cell module
Cs capacitor
UCi single cell (i=1 to 5)
Vsm module voltage
Voc open-circuit voltage
Vmax peak voltage
Pif1, Pif2 inflection point of i-V characteristic

The invention claimed is:

1. A power supply device that supplies electric power generated by a solar cell to a load, the power supply device comprising:
   a solar cell module including a plurality of solar cells that are electrically connected in series; and
   an output control circuit that supplies the electric power generated by the solar cell module to the load when an output voltage of the solar cell module increases and reaches a predetermined first voltage V1, and that interrupts the supplying of the electric power generated by the solar cell module to the load when the output voltage of the solar cell module decreases and reaches a predetermined second voltage V2,
   wherein the second voltage V2 is lower than the first voltage V1 and is higher than a second highest output voltage of output voltages of the solar cell module corresponding to inflection points in a current-voltage characteristic of the solar cell module.

2. The power supply device according to claim 1, further comprising a capacitor that is provided between the solar cell module and the output control circuit and that is connected in parallel with the solar cell module.

3. The power supply device according to claim 1, wherein the plurality of solar cells are of a dye-sensitized type.

4. The power supply device according to claim 3, wherein the second voltage V2 satisfies an inequality expression indicated below:

$$V2 \geq 0.12 \times N \text{ [V]}$$

where N denotes the number of solar cells connected in series in the solar cell module.

5. The power supply device according to claim 3, wherein an absolute value of a maximum-differential-peak value defined as a maximum value of absolute value of peak values in a differential characteristic of the current-voltage characteristic of the solar cell module is lower than or equal to $6.9 \times 10^{-3}$ mA/(cm$^2 \cdot$V).

6. A power supply device that supplies electric power generated by a solar cell to a load, the power supply device comprising:
   a solar cell module including a plurality of dye-sensitized solar cells that are electrically connected in series; and
   an output control circuit that supplies the electric power generated by the solar cell module to the load when an output voltage of the solar cell module increases and reaches a predetermined first voltage V1, and that interrupts the supplying of the electric power generated by the solar cell module to the load when the output voltage of the solar cell module decreases and reaches a predetermined second voltage V2,
   wherein the second voltage V2 is lower than the first voltage V1 and satisfies an inequality expression indicated below:

$$V2 \geq 0.12 \times N \text{ [V]}$$

where N denotes the number of dye-sensitized solar cells connected in series in the solar cell module.

7. The power supply device according to claim 6, wherein an absolute value of a maximum-differential-peak value defined as a maximum value of absolute values of peak values in a differential characteristic of a current-voltage characteristic of the solar cell module is lower than or equal to $6.9 \times 10^{-3}$ mA/(cm$^2 \cdot$V).

8. The power supply device according to claim 1, wherein a peak voltage Vmax defined as an output voltage of the solar cell module corresponding to a maximum value of absolute values of peak values in a differential characteristic of a current-voltage characteristic of the solar cell module satisfies an inequality expression indicated below:

$$V\text{max} \geq Voc \times (N-3)/N$$

where Voc denotes an open-circuit voltage of the solar cell module, and N denotes the number of solar cells connected in series in the solar cell module.

9. The power supply device according to claim 1, wherein the second voltage V2 satisfies an inequality expression indicated below:

$$V2 > V\text{max}$$

where Vmax denotes an output voltage of the solar cell module corresponding to a maximum value of absolute peak values in a differential characteristic of a current-voltage characteristic of the solar cell module.

10. An electronic apparatus comprising:
    the power supply device according to claim 1; and
    an electronic device that receives the electric power supplied from the power supply device serving as the load.

11. The electronic apparatus according to claim 10, wherein the electronic device is a beacon transmitter.

12. A signboard apparatus having a display board and a light source that radiates light onto the display board, the signboard apparatus comprising:
    the power supply device according to claim 1; and
    a beacon transmitter that receives the electric power supplied from the power supply device serving as the load,
    wherein the solar cell module in the power supply device is disposed so as to be capable of receiving light directly or indirectly from the light source.

13. An output control method for controlling supplying of electric power to a load in a power supply device that includes a solar cell module including a plurality of solar cells electrically connected in series, the output control method comprising:
    a step for supplying the electric power generated by the solar cell module to the load when an output voltage of the solar cell module increases and reaches a predetermined first voltage V1; and
    a step for interrupting the supplying of the electric power generated by the solar cell module to the load when the output voltage of the solar cell module decreases and reaches a predetermined second voltage V2,
    wherein the second voltage V2 is lower than the first voltage V1 and is higher than a second highest output voltage of output voltages of the solar cell module corresponding to inflection points in a current-voltage characteristic of the solar cell module.

14. The power supply device according to claim 6, wherein
    a peak voltage Vmax defined as an output voltage of the solar cell module corresponding to a maximum value of absolute values of peak values in a differential characteristic of a current-voltage characteristic of the solar cell module satisfies an inequality expression indicated below:

$$Vmax \geq Voc \times (N-3)/N \qquad 5$$

where Voc denotes an open-circuit voltage of the solar cell module.

15. An electronic apparatus comprising:

the power supply device according to claim 6; and an electronic device that receives the electric power supplied from the power supply device serving as the load.

16. The electronic apparatus according to claim 15, wherein the electronic device is a beacon transmitter.

17. A signboard apparatus having a display board and a light source that radiates light onto the display board, the signboard apparatus comprising:

the power supply device according to claim 6; and a beacon transmitter that receives the electric power supplied from the power supply device serving as the load, wherein the solar cell module in the power supply device is disposed so as to be capable of receiving light directly or indirectly from the light source.

18. The output control method according to claim 13, wherein the second voltage V2 satisfies an inequality expression indicated below:

$$V2 \geq 0.12 \times N [V]$$

where N denotes the number of solar cells connected in series in the solar cell module, and wherein the solar cells are dye-sensitized solar cells.

* * * * *